United States Patent
Kanda et al.

(10) Patent No.: US 10,146,496 B2
(45) Date of Patent: Dec. 4, 2018

(54) APPARATUS, SYSTEM, AND METHOD OF CONTROLLING DISPLAY IMAGE, AND RECORDING MEDIUM

(71) Applicants: Tomoki Kanda, Kanagawa (JP); Toshikazu Ohwada, Chiba (JP)

(72) Inventors: Tomoki Kanda, Kanagawa (JP); Toshikazu Ohwada, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 127 days.

(21) Appl. No.: 15/242,924

(22) Filed: Aug. 22, 2016

(65) Prior Publication Data

US 2017/0052757 A1 Feb. 23, 2017

(30) Foreign Application Priority Data

Aug. 21, 2015 (JP) .................................. 2015-163739

(51) Int. Cl.
| | | |
|---|---|---|
| G06F 3/14 | (2006.01) | |
| G09G 5/00 | (2006.01) | |
| G09G 5/14 | (2006.01) | |
| H04N 7/15 | (2006.01) | |
| H04N 7/14 | (2006.01) | |

(52) U.S. Cl.
CPC ........... *G06F 3/1462* (2013.01); *G09G 5/005* (2013.01); *G09G 5/14* (2013.01); *H04N 7/147* (2013.01); *H04N 7/15* (2013.01); *H04N 7/152* (2013.01); *G09G 2340/04* (2013.01); *G09G 2354/00* (2013.01); *G09G 2360/02* (2013.01)

(58) Field of Classification Search
None
See application file for complete search history.

(56) References Cited

U.S. PATENT DOCUMENTS

| | | |
|---|---|---|
| 2003/0115547 A1 | 6/2003 | Ohwada et al. |
| 2003/0120655 A1 | 6/2003 | Ohwada et al. |
| 2005/0259144 A1 | 11/2005 | Eshkoli |
| 2006/0274195 A1 | 12/2006 | Eshkoli |
| 2009/0177631 A1 | 7/2009 | Ohwada |
| 2010/0333004 A1 | 12/2010 | Kristiansen et al. |

(Continued)

FOREIGN PATENT DOCUMENTS

| | | |
|---|---|---|
| EP | 2 487 903 A2 | 8/2012 |
| JP | 2005/341571 | 12/2005 |

(Continued)

OTHER PUBLICATIONS

Extended Search Report dated Feb. 7, 2017 in European Patent Application No. 16183256.7.

*Primary Examiner* — Peter Hoang
(74) *Attorney, Agent, or Firm* — Oblon, McClelland, Maier & Neustadt, L.L.P.

(57) ABSTRACT

A communication management system receives, from a first communication terminal, size information indicating a size of one or more display areas to be displayed on a screen of a first display provided for the first communication terminal, determines an aspect ratio of a first display area based on the first aspect ratio of the first image and a size of the first display area, generates control information instructing to add the second image having the second aspect ratio to the first display area having the determined aspect ratio, and transmits the control information to the relay device.

14 Claims, 13 Drawing Sheets

(56) References Cited

U.S. PATENT DOCUMENTS

| | | |
|---|---|---|
| 2011/0007126 A1 | 1/2011 | Eshkoli |
| 2011/0219060 A1 | 9/2011 | Ohwada |
| 2012/0200658 A1* | 8/2012 | Duckworth ............ H04N 7/152 |
| | | 348/14.07 |
| 2012/0221702 A1* | 8/2012 | Umehara ............ H04L 12/1818 |
| | | 709/223 |
| 2013/0328998 A1 | 12/2013 | Duckworth et al. |
| 2014/0043431 A1 | 2/2014 | Kato |
| 2014/0143615 A1 | 5/2014 | Ohwada |
| 2014/0240448 A1 | 8/2014 | Kanda et al. |
| 2014/0375757 A1 | 12/2014 | Asai |
| 2015/0077511 A1 | 3/2015 | Mihara et al. |
| 2015/0149909 A1 | 5/2015 | Nakamura et al. |
| 2015/0358369 A1 | 12/2015 | Kanda et al. |
| 2016/0191328 A1 | 6/2016 | Ohwada |
| 2016/0191703 A1 | 6/2016 | Ohwada |

FOREIGN PATENT DOCUMENTS

| | | |
|---|---|---|
| JP | 2013/009098 | 1/2013 |
| JP | 2013/153419 | 8/2013 |

* cited by examiner

FIG. 7A
LAYOUT MANAGEMENT TABLE
| LAYOUT ID | POSITION (LEFT, TOP) (%) | SIZE (HORIZONTAL, VERTICAL) (%) |
|---|---|---|
| L01 | (0,16.6), (50,16.6) | (50,66.6) |
| L02 | (0,16.6), (50,16.6) | (50,66.6) |
|  | (80,80) | (19.6,19.6) |
| ... | ... | ... |
FIG. 7B
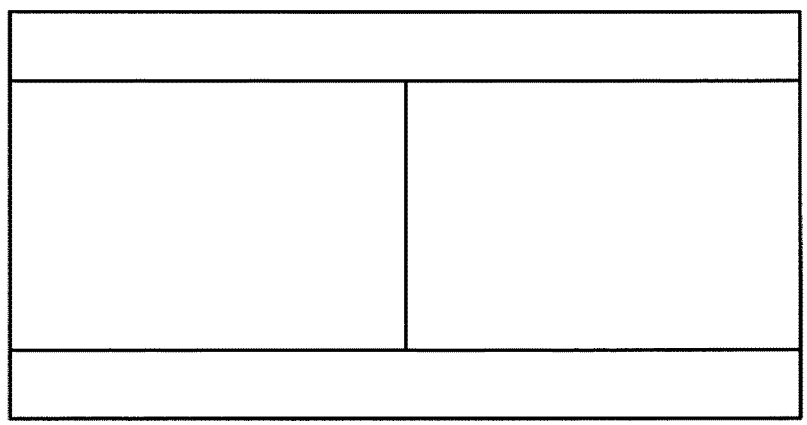
FIG. 7C
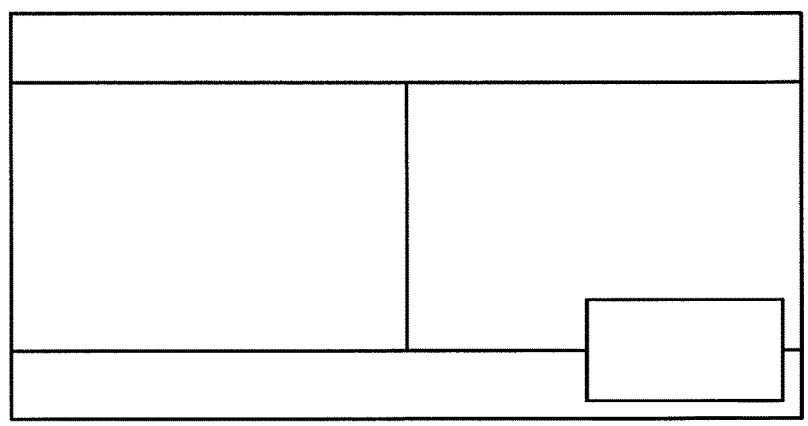

FIG. 8

TERMINAL INFORMATION MANAGEMENT TABLE

| TERMINAL ID | PASSWORD | COMMUNICATIONS PROTOCOL | ASPECT RATIO |
|---|---|---|---|
| 01aa | aaaa | DEDICATED | 16:9 |
| 01ab | abab | DEDICATED | 16:9 |
| 01ac | acac | DEDICATED | 16:9 |
| ... | ... | ... | ... |
| 01da | dada | NON-DEDICATED | 4:3 |
| 01db | dbdb | NON-DEDICATED | 4:3 |
| 01dc | dcdc | NON-DEDICATED | 4:3 |
| ... | ... | ... | ... |

FIG. 9

CONVERSION MANAGEMENT TABLE

| NON-DEDICATED TERMINAL ID | CONVERSION IP ADDRESS | NON-DEDICATED TERMINAL IP ADDRESS |
|---|---|---|
| 01da | 1.3.2.2 | 1.3.2.3 |
| 01db | 1.3.2.2 | 1.3.2.4 |
| 01dc | 1.3.2.2 | 1.3.2.5 |
| ... | ... | ... |

APPARATUS, SYSTEM, AND METHOD OF CONTROLLING DISPLAY IMAGE, AND RECORDING MEDIUM

CROSS-REFERENCE TO RELATED APPLICATIONS

This patent application is based on and claims priority pursuant to 35 U.S.C. § 119(a) to Japanese Patent Application No. 2015-163739, filed on Aug. 21, 2015, in the Japan Patent Office, the entire disclosure of which is hereby incorporated by reference herein.

BACKGROUND

Technical Field

The present invention generally relates to an apparatus, system, and method of controlling display image, and a recording medium.

Description of the Related Art

With the need for reducing costs or times associated with business trips, communication systems are widely used, which are capable of carrying out videoconferences among remotely located sites through a communication network such as the Internet. The communication systems enable transmission or reception of image data and audio data among a plurality of communication terminals, once a communication session is established among the plurality of communication terminals.

During videoconference, one or more images are displayed on a display provided for each communication terminal. In some cases, however, the aspect ratio of the image that can be processed may differ among different communication terminals. For example, when communicating between a first site and a second site, a communication terminal at the second site may be able to only process an image with a certain aspect ratio, which is different than the aspect ratio of a communication terminal at the first site. In such case, the image can be transmitted to the communication terminal at the second site, after converting its aspect ratio to match that communication terminal for display. This may sometime cause image distortion. For example, if the converted image is to be displayed to fit into a certain display area of the display, the converted image may be distorted as its aspect ratio may be again changed.

SUMMARY

Example embodiments of the present invention include a communication management system connected to a relay device through a network. The communication management system includes: a memory to store a first aspect ratio of a first image to be transmitted between a first communication terminal and the relay device, and a second aspect ratio of a second image to be transmitted between a second communication terminal and the relay device; a receiver to receive, from the first communication terminal, size information indicating a size of one or more display areas to be displayed on a screen of a first display provided for the first communication terminal, the one or more display areas including a first display area for displaying the first image; circuitry to determine an aspect ratio of the first display area based on the first aspect ratio of the first image and the size of the first display area, and generate control information for generating a combined image having the first aspect ratio, the control information instructing to add the second image having the second aspect ratio to the first display area having the determined aspect ratio; and a transmitter to transmit the control information to the relay device to cause the relay device to generate the combined image including the first display area, the combined image being transmitted to the first communication terminal for display at the first communication terminal.

Example embodiments of the present invention include a communication system including the communication management system, and the relay device.

Example embodiments of the present invention include a method of controlling display of an image, performed by the communication management system, and a recording medium storing a control program to be executed by the communication management system in performing the method of controlling display of the image.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 7A is an illustration of an example data structure of a layout management table;

FIGS. 7B and 7C are an illustration for explaining examples of layout being managed with the layout management table of FIG. 7A;

FIG. 8 is an illustration of an example data structure of a terminal information management table;

FIG. 9 is an illustration of an example data structure of a conversion management table;

Figure 1:
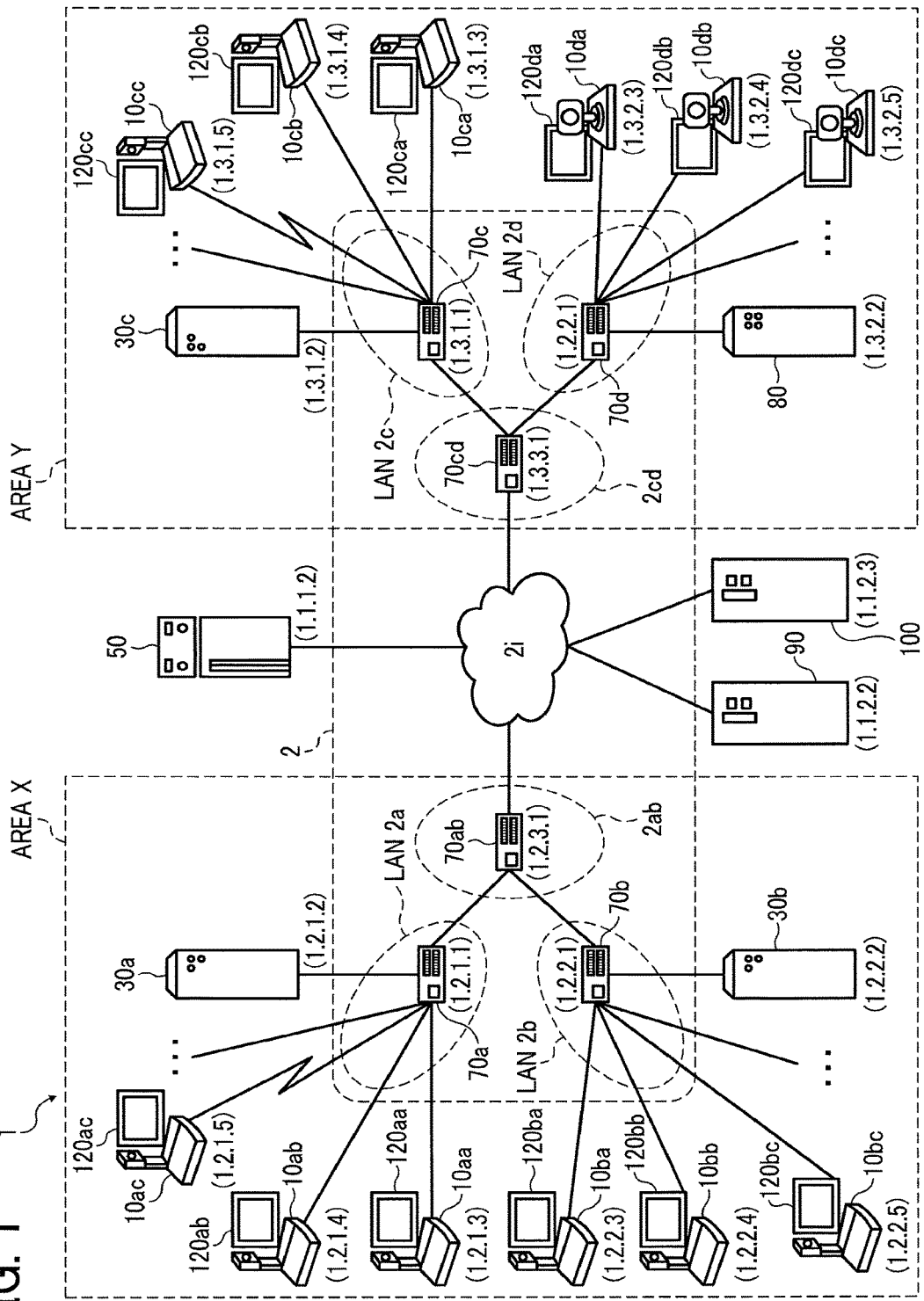
FIG. 1 is a schematic diagram illustrating a communication system according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring to the drawings, some embodiments of the present invention are described.

FIG. 1 is an overall configuration diagram of a communication system 1 according to an embodiment of the present invention. As illustrated in FIG. 1, the communication system 1 includes a plurality of communication terminals (10aa, 10ab, . . . ), a plurality of displays (120aa, 120ab, . . . ) for respective communication terminals (10aa, 10ab, . . . ), a plurality of relay devices (30a, 30b, 30c), a communication management system 50, a conversion system 80, a program providing system 90, and a maintenance system 100. The communication system 1 controls communication of content data, such as image data and audio data, to carry out videoconference among a plurality of remotely located sites. One or more of a plurality of routers (70a, 70b, 70c, 70d, 70ab, 70cd) are selected to relay content data via an optical route.

The terminals (10aa, 10ab, 10ac, . . . ), the relay device 30a, and the router 70a are connected through a LAN 2a to be communicable with each other. The terminals (10ba, 10bb, 10bc, . . . ), the relay device 30b, and the router 70b are connected through a LAN 2b to be communicable with each other. The LAN 2a and the LAN 2b are connected through a dedicated line 2ab including the router 70ab to be communicable with each other. The LAN 2a, the LAN 2b, and the dedicated line 2ab are provided in an area X. For example, when the area X is Japan, the LAN 2a may be located in Tokyo, and the LAN 2b may be located in Osaka.

The terminals (10ca, 10cb, 10cc, . . . ), the relay device 30c, and the router 70c are connected through a LAN 2c to be communicable with each other. The terminals (10da, 10db, 10dc, . . . ), the conversion system 80, and the router 70d are connected through a LAN 2d to be communicable with each other. The LAN 2c and the LAN 2d are connected through a dedicated line 2cd including the router 70cd to be communicable with each other. The LAN 2c, the LAN 2d, and the dedicated line 2cd are provided in an area Y. For example, when the area Y is the United States, the LAN 2c may be located in New York, and the LAN 2d is located in Washington, D.C. The areas X and Y are connected through the routers (70ab, 70cd) to the Internet 2i to be communicable.

In this disclosure, a "communication terminal" may simply be referred to as a "terminal", and a "communication management system" may simply be referred to as a "management system". Further, any arbitrary terminal of the plurality of terminals (10aa, 10ab, . . . ) is referred to as the terminal 10. Any arbitrary display of the plurality of displays (120aa, 120ab, . . . ) is referred to as the display 120. Any arbitrary relay device of the relay devices (30a, 30b, 30c) is referred to as the relay device 30. In this disclosure, the communication terminal that sends a request for starting videoconference is referred to as the "starting terminal", and the communication terminal serving as a request destination (relay destination) of videoconference is referred to as the "counterpart terminal". Any arbitrary router of the plurality of routers (70a, 70b, 70c, 70d, 70ab, 70cd) is referred to as the router 70.

The management system 50, the program providing system 90, and the maintenance system 100 are connected to the Internet 2i. The conversion system 80 is connected to the router 70d on the LAN 2d in the area Y. The management system 50, the program providing system 90, and the maintenance system 100 may be provided in any of the areas X and Y, or any area other than the areas X and Y.

In this example, the communication network 2 includes the LAN 2a, the LAN 2b, the dedicated line 2ab, the Internet 2i, the dedicated line 2cd, the LAN 2c, and the LAN 2d. The communication network 2 may not only include a wired network, but also a wireless network such as a network in compliance with WiFi (Wireless Fidelity) or Bluetooth.

In FIG. 1, four digits shown below each one of the terminals 10, the relay devices 30, the management system 50, the routers 70, the conversion system 80, the program providing system 90, and the maintenance system 100 indicate a simplified expression of IP address that is assigned to each device capable of functioning as a communication device. For example, the terminal 10aa is assigned with the terminal IP address "1.2.1.3". For simplicity, the IP address is expressed in Internet Protocol version 4 (IPv4), but the IP address may be expressed in IPv6 instead.

Note that the terminal 10 may be used not only for communication between different offices or for communication between different rooms in the same office, but also for communication within the same room or for outdoor-indoor communication or outdoor-outdoor communication. In the case where the terminal 10 is used outside, wireless communication using a mobile phone communication network or the like is performed.

The terminal 10 illustrated in FIG. 1 may be implemented by a videoconference terminal capable of carrying out communication by a user through transmission or reception of content data. More specifically, the terminal 10 transmits or receives content data using a predetermined communications protocol. The communications protocol used by the terminal 10 is mainly defined by a call control protocol used for connecting or disconnecting connections with the counterpart terminal, and an encoding format used for encoding the contents data to an IP packet.

Examples of the call control protocol being used by the terminal 10 include, but not limited to, (1) session initial protocol (SIP), (2) H.323, (3) the extended SIP, (4) Instant Messenger (IM) Protocol such as extensible messaging and presence protocol (XMPP), ICQ (Registered Trademark), AIM (Registered Trademark), or Skype (Registered Trademark), (5) protocol using the SIP message method, (6) Internet relay chat (IRC) protocol, and (7) extended IM based protocol such as Jingle.

Further, in this example, any one of the communication terminal 10 that communicates data using a predetermined communications protocol, is referred to as a dedicated terminal 10a. In one example, the dedicated terminal 10a uses the (4) IM protocol or the (7) extended IM based protocol as a call control protocol, and the Scalable Video Coding (SVC) as an encoding format. The SVC is the Annex G extension of the AGC.

Further, any one of the communication terminal 10 that communicates data using a communications protocol other than the predetermined communications protocol of the dedicated terminal 10a, is referred to as a non-dedicated terminal 10d. In this example, when the communication terminal 10 uses a call control protocol other than the (4) IM protocol or the (7) extended IM based protocol, and/or an encoding format other than the SVC, it is determined that the communication terminal 10 is the non-dedicated terminal 10d. For example, the non-dedicated terminal 10 may use the (1) SIP or (2) H.323, as the call control protocol.

In one example, whether the terminal 10 is the dedicated terminal 10a or the non-dedicated terminal 10d may depend on a specific organization that manufactures, sells, or manages the terminal 10, as the communications protocol may be determined based on a communications network or system in use by the specific organization. The dedicated terminal 10a is defined as a communication terminal that is manufactured, sold, or managed by a specific organization such as a specific company. The non-dedicated terminal 10d is defined as a communication terminal that is manufactured, sold, or managed by an organization other than the specific organization.

In another example, whether the terminal 10 is the dedicated terminal 10a or the non-dedicated terminal 10d may depend on time when the terminal 10 is manufactured, or time when the terminal 10 is sold such as when it is released to the market. The dedicated terminal 10a may be defined as a communication terminal that is manufactured or sold by a specific organization, after the time when the non-dedicated terminal 10d is manufactured or sold by the specific organization. For example, even though the dedicated terminal 10a and the non-dedicated terminal 10d are both manufactured, sold, or managed by the same organization, the dedicated terminal 10a may be a new model such that it communicates using a different communications protocol than the communications protocol of the non-dedicated terminal 10d.

Moreover, in this example, the dedicated terminal 10a is capable of processing an image having an aspect ratio of 16:9, due to the predetermined communications protocol as described above. On the other hand, the non-dedicated terminal 10d is capable of processing an image having an aspect ratio of 4:3, but not an image with an aspect ratio of 16:9, due to the communications protocol that is different than the predetermined communications protocol for the dedicated terminal.

The relay device 30, which may be implemented by one or more computers, relays content data among the plurality of terminals 10. The management system 50, which may be implemented by one or more computers, centrally manages login authentication of the terminal 10, a communication state of the terminal 10, a contact list, and a communication state of the relay device 30. The image data may be a video image or a still image, or both of the video image and the still image.

The conversion system 80 operates as a signaling gateway that converts call control signals, and a video/audio gateway that encodes content data. That is, the conversion system 80 is a gateway capable of converting at least one of the call control protocol and the encoding format (the communications protocol) between the starting terminal 10 and the counterpart terminal 10.

The program providing system 90, which may be implemented by one or more computers, provides a control program to the terminal 10, the relay device 30, the management system 50, the conversion system 80, and the maintenance system 100.

The maintenance system 100 is a computer system, which may be implemented by one or more computers, to maintain, manage, fix, or upgrade at least one of the terminal 10, relay device 30, management system 50, conversion system 80, and program providing system 90. Assuming that the maintenance system 100 is provided within a country, and the terminal 10, relay device 30, management system 50, conversion system 80, and program providing system 90 are each installed outside the country, the maintenance system 100 maintains, manages, fixes, or upgrades at least one of the terminal 10, relay device 30, management system 50, conversion system 80, and program providing system 90, remotely through the communication network 2. The maintenance system 100 may manage maintenance of at least one of the terminal 10, relay device 30, management system 50, conversion system 80, and program providing system 90 without using the communication network 2. For example, a machine type number, a manufacturing number, customer information, maintenance and repair information, and failure log information may be maintained at the maintenance system 100 without using the communication network 2.

Figure 2:
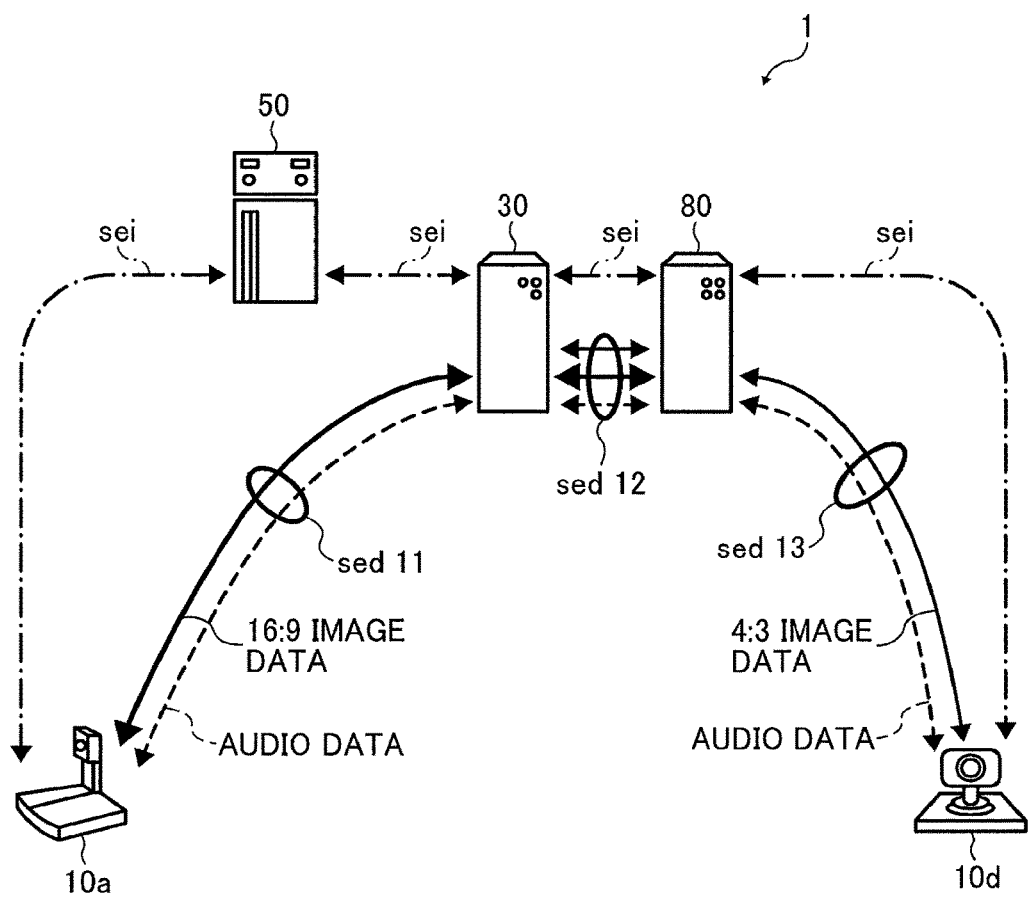
FIG. 2 is an illustration for explaining an example case in which a plurality of communication terminals having different communications protocols communicate with each other.

Referring now to FIG. 2, operation of preparing for starting communication between the dedicated terminal 10a and the non-dedicated terminal 10d is described according to an embodiment of the present invention. FIG. 2 illustrates an example case in which the terminals 10 having different communications protocols communicate with each other.

As illustrated in FIG. 2, the communication system 1 controls communication of content data in different communications protocol including H.264/SVC standard and H.261 standard. In the communication system 1, the management system 50 establishes a management data communication session "sei" with the dedicated terminal 10a and the non-dedicated terminal 10d, respectively, to transmit or receive various management data.

The dedicated terminal 10a establishes a first content data communication session "sed11" with the relay device 30, to transmit or receive image data with the aspect ratio of 16:9 in the H.264/SVC standard, and audio data. The relay device 30 establishes a second content data communication session "sed12" with the conversion system 80, to transmit or receive image data with the aspect ratio of 16:9 or the aspect ratio of 4:3, in the H.264/SVC standard, and audio data.

The conversion system 80 establishes a third content data communication session "sed13" with the non-dedicated terminal 10d, to transmit or receive image data with the aspect ratio of 4:3 in the H.261 standard, and audio data.

<Hardware Configuration of Communication System>

Figure 3:
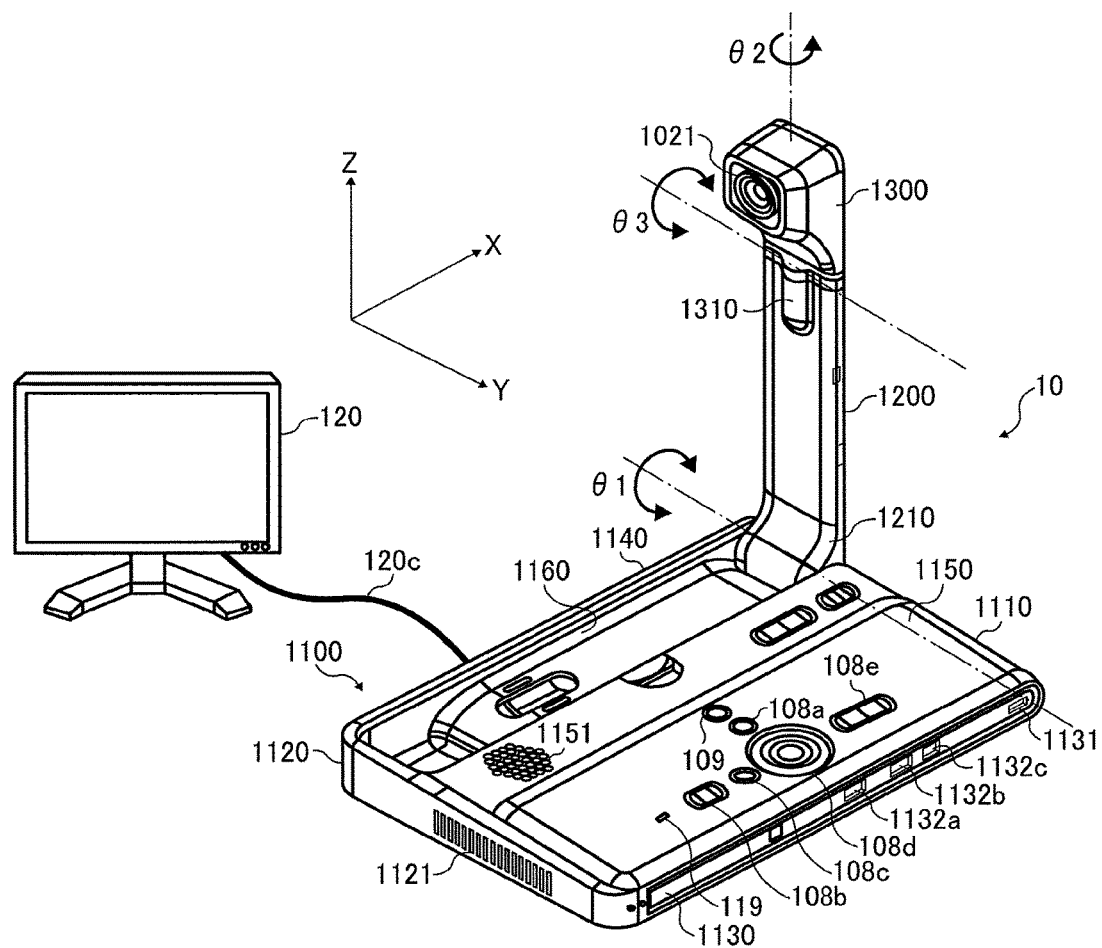
FIG. 3 is a perspective view illustrating an external appearance of a communication terminal of the communication system of FIG. 1, according to an embodiment of the present invention.

Now, a hardware configuration of the communication system 1 is described. FIG. 3 is a perspective view illustrating an external appearance of a communication terminal of the communication system of FIG. 1. As illustrated in FIG. 3, the terminal 10 includes a casing 1100, an arm 120, and a camera housing 1300. The casing 1100 has a front wall 1110 provided with an inlet face including a plurality of inlet holes, and a back wall 1120 having an exhaust face 1121 on which a plurality of exhaust holes is formed. When a cooling fan in the casing 1100 is driven, air flows in through the intake holes of the intake surface and out through the exhaust holes of the exhaust surface 1121. The casing 1100 further includes a right side wall 1130 formed with a sound pickup hole 1131. A right-side wall 1130 of the casing 1100 has a sound pickup hole 1131 formed thereon, and a built-in microphone 114, described later, is capable of picking up sound such as sound, noise, or vibration.

The casing 1100 has an operation panel 1150, which is provided at a front surface toward the right side wall 1130. The operation panel 1150 includes a plurality of operation keys 108a to 108e, a power switch 109, and a plurality of sound output holes 1151. Through the sound output holes 1151, a speaker 115 of the terminal 10 is able to output sounds such as sounds generated based on human voice. The casing 1100 further includes a holder 1160, which is provided at the front surface toward the left side wall 1140. The holder 1160, which has a concave shape, accommodates therein the arm 1200 and the camera housing 1300. The right side wall 1130 is further provided with a plurality of connection ports 1132a to 1132c ("connection ports 1132"). The connection ports 1132 allow electrical connection to an external device through an external device connection I/F 118. In contrast, a connection port for electrically connecting a cable 120c for a display 120 to the external device connection I/F 118 described later is provided toward the left-side wall 1140 of the casing 1100.

The following description uses the term "operation key(s) 108" for indicating an arbitrary one or ones of the operation keys (108a to 108e), and the term "connection port(s) 1132" for indicating an arbitrary one or ones of the connection ports (1132a to 1132c).

The arm 1200 is attached to the casing 1100 via a torque hinge 1210 so as to be rotatable in the vertical direction within the range of a tilt angle θ1 of 135 degrees with respect to the casing 1100. FIG. 3 illustrates the case where the tilt angle θ1 is 90 degrees. The camera housing 1300 has a built-in camera 112 provided thereon, which will be described later, and the camera 112 can capture an image of a user, a document, a room, or the like. The camera housing 1300 is formed with a torque hinge 1310. The camera housing 1300 is attached to the arm 1200 through the torque hinge 1310. The camera housing 1300 is attached to the arm 1200 via the torque hinge 1310 so as to be rotatable in the vertical and horizontal directions within the range of a pan angle θ2 of ±180 degrees and a tilt angle θ3 of ±45 degrees with respect to the arm 1200, in which the state illustrated in FIG. 3 serves as 0 degrees.

Since the relay device 30, the communication management system 50, the conversion system 80, the program providing system 90, and the maintenance system 100 has the same appearance as that of a general server computer, a description of the appearance thereof is omitted.

Figure 4:
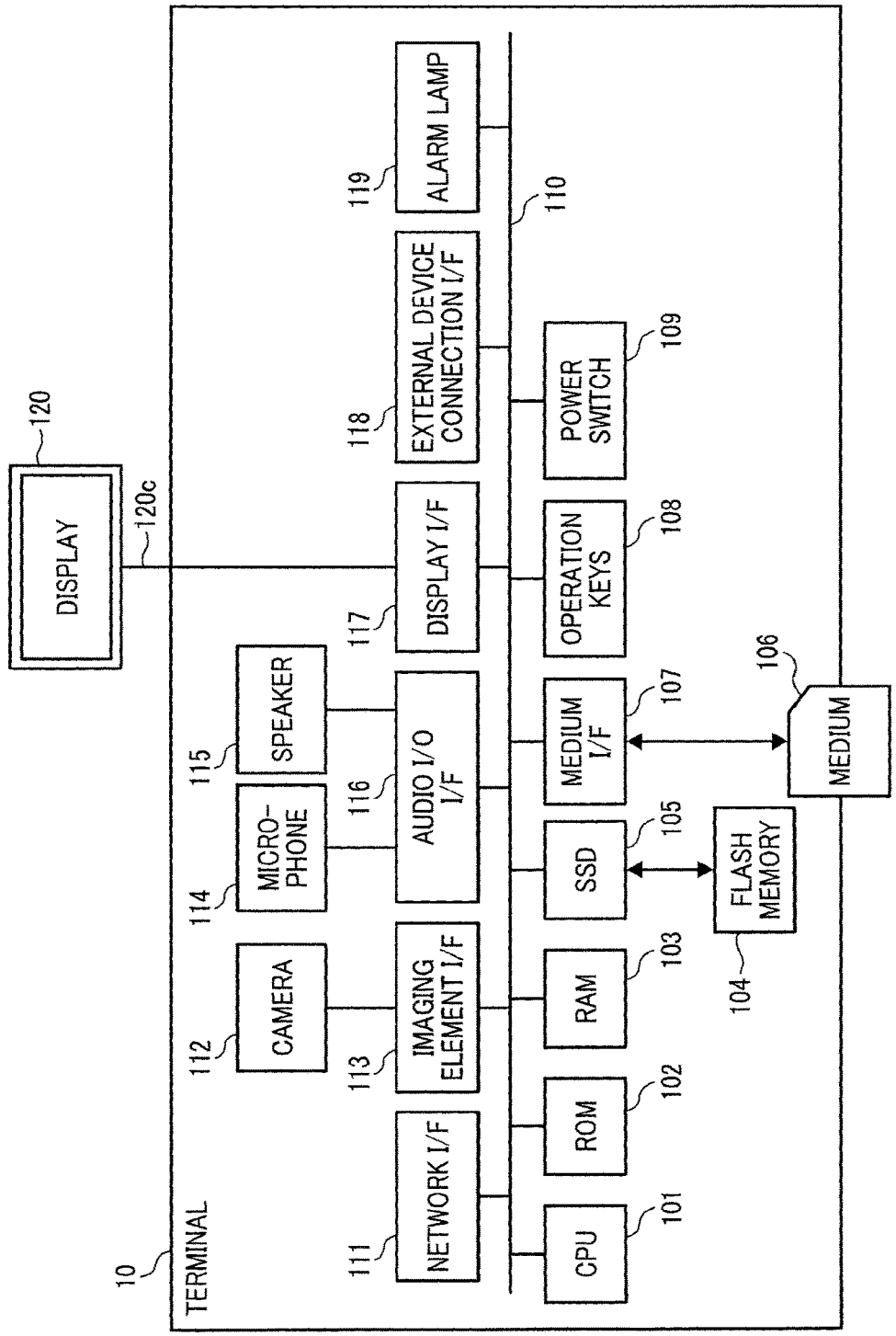
FIG. 4 is a schematic block diagram illustrating a hardware configuration of the communication terminal of FIG. 3, according to an embodiment of the present invention.

FIG. 4 is a schematic block diagram illustrating a hardware configuration of the communication terminal 10. As illustrated in FIG. 4, the communication terminal 10 of the embodiment includes a central processing unit (CPU) 101 that controls entire operation of the communication terminal 10, a read only memory (ROM) 102 that stores a program for operating the CPU 101 such as an initial program loader (IPL), a random access memory (RAM) 103 that operates as a work area for the CPU 101, a flash memory 104 that stores various types of data, such as the terminal control program, image data, and audio data, a solid state drive (SSD) 105 that controls reading/writing of various types of data from/to the flash memory 104 under control of the CPU 101, a medium I/F 107 that controls reading/writing (storage) of data from/to a recording medium 106, the operation key 108 operated in the case of, for example, selecting a counterpart terminal of the communication terminal 10, the power switch 109 for turning on/off the power of the communication terminal 10, and a network interface (I/F) 111 for transmitting data using the communication network 2.

The terminal 10 further includes the built-in camera 112 that captures an image of a subject and obtains image data under control of the CPU 101, an imaging element I/F 113 that controls driving of the camera 112, the built-in microphone 114 that receives an audio input, the built-in speaker 115 that outputs sounds, an audio input/output I/F 116 that processes inputting/outputting of an audio signal between the microphone 114 and the speaker 115 under control of the CPU 101, a display I/F 117 that transmits image data to an external display 120 under control of the CPU 101, the external device connection I/F 118 for connecting various external devices, an alarm lamp 119 for notifying of an error in functionality of the terminal 10, and a bus line 110 such as an address bus and a data bus for electrically connecting the above-described elements as illustrated in FIG. 4.

The display 120 is a display formed of liquid crystal or organic electroluminescence (EL) that displays an image of a subject, an operation icon, or the like. The display 120 is connected to the display I/F 117 by the cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data through photoelectric conversion. As the solid-state imaging element, for example, a complementary metal-oxide-semiconductor (CMOS) or a charge-coupled device (CCD) is used.

The external device connection I/F 118 is capable of connecting an external device such as an external camera, an external microphone, or an external speaker by using a Universal Serial Bus (USB) cable that is inserted into the connection port 1132 or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

The recording medium 106 is removable from the communication terminal 10. The recording medium 106 can be any non-volatile memory that reads or writes data under control of the CPU 101, such that any memory such as an electrically erasable and programmable read-only memory (EEPROM) may be used instead of the flash memory 104.

Figure 5:
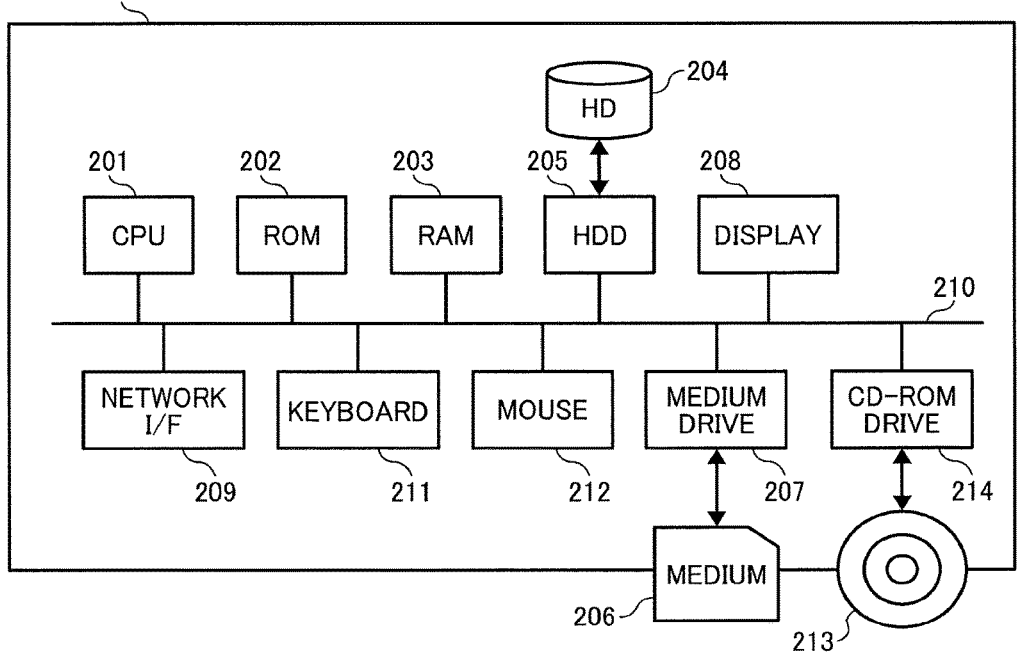
FIG. 5 is a schematic block diagram illustrating a hardware configuration of a communication management system, relay device, conversion system, program providing system, or maintenance system of the communication system of FIG. 1, according to an embodiment of the present invention.

FIG. 5 is a diagram illustrating a hardware configuration of the communication management system 50 according to the embodiment. The management system 50 includes a CPU 201 that controls entire operation of the management system 50, a ROM 202 that stores a program used for driving the CPU 201 such as an IPL, a RAM 203 used as a work area for the CPU 201, the HD 204 that stores various types of data such as the communication management program, a hard disk drive (HDD) 205 that controls reading/writing of various types of data from/to the HD 204 under control of the CPU 201, a medium drive 207 that controls reading/writing (storage) of data from/to a recording medium 206 such as a flash memory, a display 208 that displays various types of information such as a cursor, a menu, a window, characters, or an image, a network I/F 209 for transmitting data using the communication network 2, a keyboard 211 including a plurality of keys for entering characters, numerals, and various instructions, a mouse 212 that selects and executes various instructions such as selection of a processing target or movement of the cursor, a compact disc read-only memory (CD-ROM) drive 214 that controls reading/writing of various types of data from/to a CD-ROM 213 serving as an example of a removable recording medium, and a bus line 210 such as an address bus and a data bus for electrically connecting the above-described elements.

Since the relay devices 30, the conversion system 80, the program providing system 90, and the maintenance system 100 each have a hardware configuration that is the same as or similar to that of the above-described management system 50, a description thereof is omitted. While the hardware is substantially the same, a control program stored in the HD 204 differs among the relay device 30, the conversion system 80, the program providing system 90, and the maintenance system 100.

Note that the control program for each one of the communication terminal 10, the relay device 30, the management system 50, the conversion system 80, the program providing system 90, and the maintenance system 100 may be recorded in a file in a format installable or executable on a computer-readable recording medium (such as the medium 106) for distribution. Examples of such recording medium include, but not limited to, compact disc-recordable (CD-R), digital versatile disc (DVD), and blue-ray disc.

<Functional Configuration of Communication System>

Figure 6:
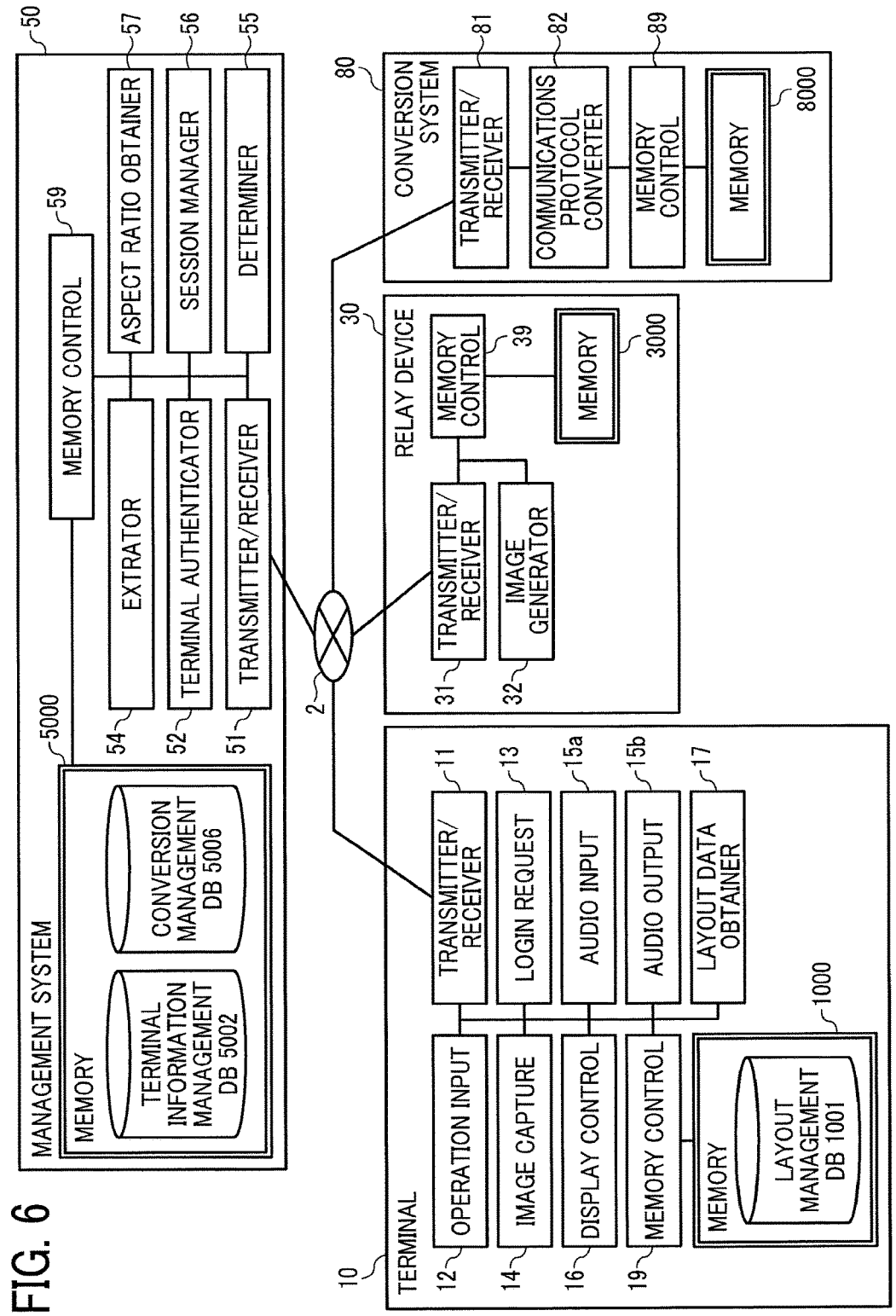
FIG. 6 is a schematic block diagram illustrating a functional configuration of the communication terminal, the relay device, the management system, and the conversion system in the communication system of FIG. 1, according to the embodiment of the present invention.

Now, a functional configuration of the communication system 1 is explained. FIG. 6 is a schematic block diagram illustrating a functional configuration of the terminal 10, the relay device 30, the management system 50, and the conversion system 80 in the communication system 1, according to the embodiment of the present invention. In FIG. 6, the terminal 10, the relay device 30, the management system 50, and the conversion system 80 are connected with one another to transmit or receive data via the communication network 2.

<Functional Configuration of Terminal>

The terminal 10 includes a transmitter/receiver 11, an operation input 12, a login request 13, an image capturer 14, an audio input 15a, an audio output 15b, a display control 16, a layout data obtainer 17, and a memory control 19. These units are functions that are implemented by or that are caused to function by operating any of the hardware components illustrated in FIG. 4 in cooperation with the instructions of the CPU 101 according to the terminal control program expanded from the flash memory 104 to the RAM 103. The terminal 10 further includes a memory 1000 configured by the RAM 103 and the flash memory 104.

(Layout Management Table)

FIG. 7A is an illustration of an example data structure of a layout management table. The memory 1000 stores a layout management DB 1001, such as the layout management table of FIG. 7A. The layout management table of FIG. 7A stores, for each layout to be used for content data to be output through the display 120 provided for the terminal 10, a layout ID identifying the layout, position information indicating a coordinate of the upper left corner of a frame in the layout, and size information indicating a size of the frame. In this embodiment, the frame is defined as a display area for displaying an image based on image data transmitted or received between the terminals 10. Further, in the following, it is assumed that the display 120 has an aspect ratio of 16:9, with the horizontal resolution of 1920 pixels and the vertical resolution of 1080 pixels. The position information in the layout management table defines the coordinate of the upper left corner of the frame in percentage. The value of percentage is defined such that the value (0%, 0%) is set to the coordinate of the upper left corner of the display 120, and the value (100%, 100%) is set to the coordinate of the lower right corner of the display 120. The size information in the layout management table defines the size of the frame in percentage. The value of percentage is defined such that the value (100%, 100%) is set to the resolution of the display 120.

FIG. 7B illustrates a layout identified with the layout ID "L01" in the layout management table of FIG. 7A. According to the layout "L01" of FIG. 7B, two frames are arranged. One frame is arranged at the position (0%, 16.6%), and the other frame is arranged at the position (50%, 16.6%). Each frame has a size of (50%, 66.6%). Based on this layout, when each frame is to be displayed on the display 120 having the resolution of 1920 pixels by 1080 pixels, the horizontal and vertical lengths will be 960 (1920*50%) pixels and 720 (1080*66.6%) pixels, respectively, such that the aspect ratio of the frame will be 4:3.

FIG. 7C illustrates a layout identified with the layout ID "L02" in the layout management table of FIG. 7A. According to the layout of FIG. 7C, in addition to those frames as described above referring to FIG. 7C, one additional frame will be displayed. This additional frame is positioned at (80%, 80%), and has a size of (19.6%, 19.6%). Based on this layout, when this additional frame is to be displayed on the display 120 having the resolution of 1920 pixels by 1080 pixels, the horizontal and vertical lengths will be 376 (1920*19.6%) pixels and 211 (1080*19.6%) pixels, respectively, such that the aspect ratio of the frame will be 16:9.

Referring to FIGS. 4 and 6, a functional configuration of the terminal 10 is described according to the embodiment. In the following description of functional configuration of the terminal 10, relationships of the elements in FIG. 4 with the functional configuration of the terminal 10 in FIG. 6 will also be described.

The transmitter/receiver 11 of the terminal 10, which may be implemented by the instructions of the CPU 101, and the network I/F 111, transmits or receives various data (or information) to or from each terminal, device, or system.

The operation input 12, which may be implemented by the instructions of the CPU 101, the operation key 108, or the power switch 109, receives various inputs from the user.

The login request 13 may be implemented by the instructions of the CPU 101. For example, as the power is turned on, the login request 13 controls the transmitter/receiver 11 to automatically transmit login request information for requesting login, and a current IP address of the starting terminal 10, to the management system 50 through the communication network 2. In addition, when the user turns the power switch 109 from on to off, the transmitter/receiver 11 transmits to the management system 50 state information indicating that the power is to be turned off, and then the operation input 12 completely turns off the power. Accordingly, the management system 50 can detect that the power of the terminal 10 is turned from on to off.

The image capturer 14, which is implemented by instructions from the CPU 101 and by the camera 112 and the imaging element I/F 113, captures an image of a subject and outputs image data obtained by capturing the image.

The audio input 15a is implemented by the instructions of the CPU 101 illustrated in FIG. 4 and by the audio input/output I/F 116 illustrated in FIG. 4. After the sound of the user is converted to an audio signal by the microphone 114, the audio input 15a receives audio data according to this audio signal. The audio output 15b is implemented by the instructions of the CPU 101 illustrated in FIG. 4 and by the audio input/output I/F 116 illustrated in FIG. 4, and outputs the audio signal according to the audio data to the speaker 115, and the speaker 115 outputs sound.

The display control 16, which may be implemented by the instructions of the CPU 101 and the display I/F 117, controls transmission of image data to the display 120.

The layout data obtainer 17, which may be implemented by the instructions of the CPU 101, searches the layout management table (FIG. 7A) using a layout ID selected by the user to obtain the position information and the size information of each frame associated with the selected layout ID.

The memory control 19, which may be implemented by the instructions of the CPU 101 and the SSD 105 illustrated in FIG. 4, or the instructions of the CPU 101, stores various data in the memory 1000 or reads various data from the memory 1000. The memory 1000 stores a terminal identification (ID) for identifying each terminal 10, a password, and the like. Further, every time image data and audio data are received in performing communication with a counterpart terminal, the memory 1000 overwrites the image data and audio data. The display 120 displays an image based on image data before being overwritten, and the speaker 115 outputs sound based on audio data before being overwritten.

Note that a terminal ID and a later-described relay device ID in the embodiment are examples of identification information that is used to uniquely identify a specific terminal 10 and a specific relay device 30, respectively, such that a language, a character(s), a symbol(s), or various marks are not limited to the above-described embodiment. For example, a combination of at least two of the above-mentioned language, character(s), symbol(s), and various marks may be used as a terminal ID or a relay device ID. Further, in alternative to the terminal ID, any identification information that identifies the terminal 10 may be used such as a user ID for identifying a user operating the terminal 10.

<Functional Configuration of Relay Device>

The relay device 30 includes a transmitter/receiver 31, an image generator 32, and a memory control 39. These units are functions that are implemented by or that are caused to function by operating any of the hardware components illustrated in FIG. 5 in cooperation with the instructions of the CPU 201 according to the relay device control program expanded from the HD 204 to the RAM 203. The relay device 30 further includes a memory 3000, which may be implemented by the RAM 203 and/or the HD 204.

(Functional Configuration of Relay Device)

Next, a functional configuration of the relay device 30 is described in detail. In the following description of functional configuration of the relay device 30, relationships of the hardware elements in FIG. 5 with the functional configuration of the relay device 30 in FIG. 6 will also be described.

The transmitter/receiver 31 of the relay device 30, which may be implemented by the instructions of the CPU 201 and the network I/F 209, transmits or receives various data (or information) to or from each terminal, device, or system through the communication network 2. In one example, the transmitter/receiver 31 initializes a communication session, being managed at the relay device 30.

The image generator 32, which may be implemented by the instructions from the CPU 201, generates image data according to the layout information obtained at the terminal 10, such that the image data received from each terminal 10 is arranged in one or more frames as defined by the layout information.

The memory control 39, which may be implemented by the instructions of the CPU 201 and the HDD 205, or the instructions of the CPU 201, stores various data in the memory 3000 or reads various data from the memory 3000.

<Functional Configuration of Management System>

Referring to FIG. 6, the management system 50 includes a transmitter/receiver 51, a terminal authenticator 52, an extractor 54, a determiner 55, a session manager 56, an aspect ratio obtainer 57, and a memory control 59. These elements correspond to a plurality of functions of hardware elements in FIG. 5, which operate according to the instructions of the CPU 201 (FIG. 5) that are generated according to the communication management program read from the RAM 203 onto the HD 204. The management system 50 further includes a memory 5000, which may be implemented by the HD 204.

(Terminal Information Management Table)

FIG. 8 is an illustration of an example data structure of a terminal information management table. The memory 5000 stores a terminal information management DB 5002 such as the terminal information management table illustrated in FIG. 8. The terminal information management table (FIG. 8) stores, for each one of the terminals 10 managed by the management system 50, a terminal ID for identifying the terminal 10, a password for authentication, a communications protocol being used by the terminal 10, and an aspect ratio of image data that can be processed by the terminal 10, in association with one another. For example, the terminal information management table illustrated in FIG. 8 indicates that the terminal 10aa has the terminal ID "01aa", the password "aaaa", the communications protocol "dedicated", and the aspect ratio "16:9".

The communications protocol "dedicated" corresponds to the communications protocol to be used by the dedicated terminal 10a as described above referring to FIG. 2. The communications protocol "non-dedicated" corresponds to the communications protocol to be used by the non-dedicated terminal 10d as described above referring to FIG. 2.

(Conversion Management Table)

FIG. 9 is an illustration of an example data structure of a conversion management table. The memory 5000 stores a conversion management DB 5006 such as the conversion management table illustrated in FIG. 9. The conversion management table of FIG. 9 stores the terminal ID of the non-dedicated terminal 10d, the IP address of the conversion system 80, and the IP address of the non-dedicated terminal 10d, in association with one another.

(Functional Configuration of Management System)

Next, referring back to FIG. 6, a functional configuration of the management system 50 will be described in detail. In the following description of the functional configuration of the management system 50, relationships of the elements in FIG. 5 with the functional configuration of the management system 50 in FIG. 6 is also described.

The transmitter/receiver 51, which may be implemented by the instructions of the CPU 201 and the network I/F 209, transmits or receives various data (or information) to or from each terminal, device, or system through the communication network 2.

The terminal authenticator 52, which is implemented by the instructions of the CPU 201 illustrated in FIG. 5, performs terminal authentication by searching the terminal information management DB 5002 of the memory 5000 by using a terminal ID and a password included in login request information received via the transmitter/receiver 51 as search keys and determining whether the same pair of a terminal ID and a password is managed in the terminal information management table (FIG. 8).

The extractor 54, which may be implemented by the instructions of the CPU 201, searches through various management DBs in the memory 5000 using a search key, to extract data (information) that matches the search key as a search result.

The determiner 55, which may be implemented by the instructions of the CPU 201, determines whether an aspect ratio of the image data to be transmitted from the counterpart (or starting) terminal 10 matches an aspect ratio of one or more frames to be displayed at the starting (or the counterpart) terminal 10.

The session manager 56 generates a session ID to be referred to when establishing a communication session. For example, the session manager 56 stores the generated session ID in the memory 5000, in association with the terminal IDs of the terminals participating in that session.

The aspect ratio obtainer 57, which may be implemented by the instructions of the CPU 201, obtains an aspect ratio of one or more frames to be displayed at the starting terminal 10 or the counterpart terminal 10.

The memory control 59, which may be implemented by the instructions of the CPU 201 and the HDD 205, or the instructions of the CPU 201, stores various data in the memory 5000 or reads various data from the memory 5000.

<Functional Configuration of Conversion System>

The conversion system 80 includes a transmitter/receiver 81, a communications protocol converter 82, and a memory control 89. These elements correspond to a plurality of functions of hardware elements in FIG. 5, which operate according to the instructions of the CPU 201 (FIG. 5) that are generated according to the communication management program read from the RAM 203 onto the HD 204. The conversion system 80 further includes a memory 8000, which may be implemented by the RAM 203 and/or the HD 204. The memory 8000 stores conversion rule data to be used in converting communications protocol among the plurality of terminals 10. For example, the conversion rule data controls conversion between the communications protocol compatible with the dedicated terminal, and the communications protocol compatible with the non-dedicated terminal.

Referring to FIGS. 5 and 6, a functional configuration of the conversion system 80 is described in detail. In the following description of the functional configuration of the conversion system 80, relationships of the elements in FIG. 5 with the functional configuration of the conversion system 80 in FIG. 6 is also described.

The transmitter/receiver 81 of the conversion system 80, which may be implemented by the instructions from the CPU 201, and the network I/F 209, transmits or receives various data (or information) to or from each terminal, device, or system through the communication network 2. In one example, the transmitter/receiver 81 transmits session start instruction information, which instructs starting of a communication session (such as the third content communication session), to a counterpart terminal identified with destination information transmitted from the relay device 30. The destination information may be the IP address or the URI (uniform resource identifier) of the counterpart terminal that is selected as a communication destination.

The communications protocol converter 82 converts the communications protocol of content data according to the conversion rule data stored in the memory 8000, between the content data transmitted from the starting terminal and the content data transmitted from the counterpart terminal. More specifically, the communications protocol converter 82 converts at least one of the call control protocol and the encoding format. The communications protocol converter 82 may additionally convert an aspect ratio of the image data to be transmitted to the starting terminal 10 or the counterpart terminal 10, depending on the communications protocol of the starting terminal 10 or the counterpart terminal 10.

The memory control 89, which may be implemented by the instructions from the CPU 201 and the HDD 205, stores various data in the memory 8000 or reads various data from the memory 8000.

<Operation>

Figure 10:
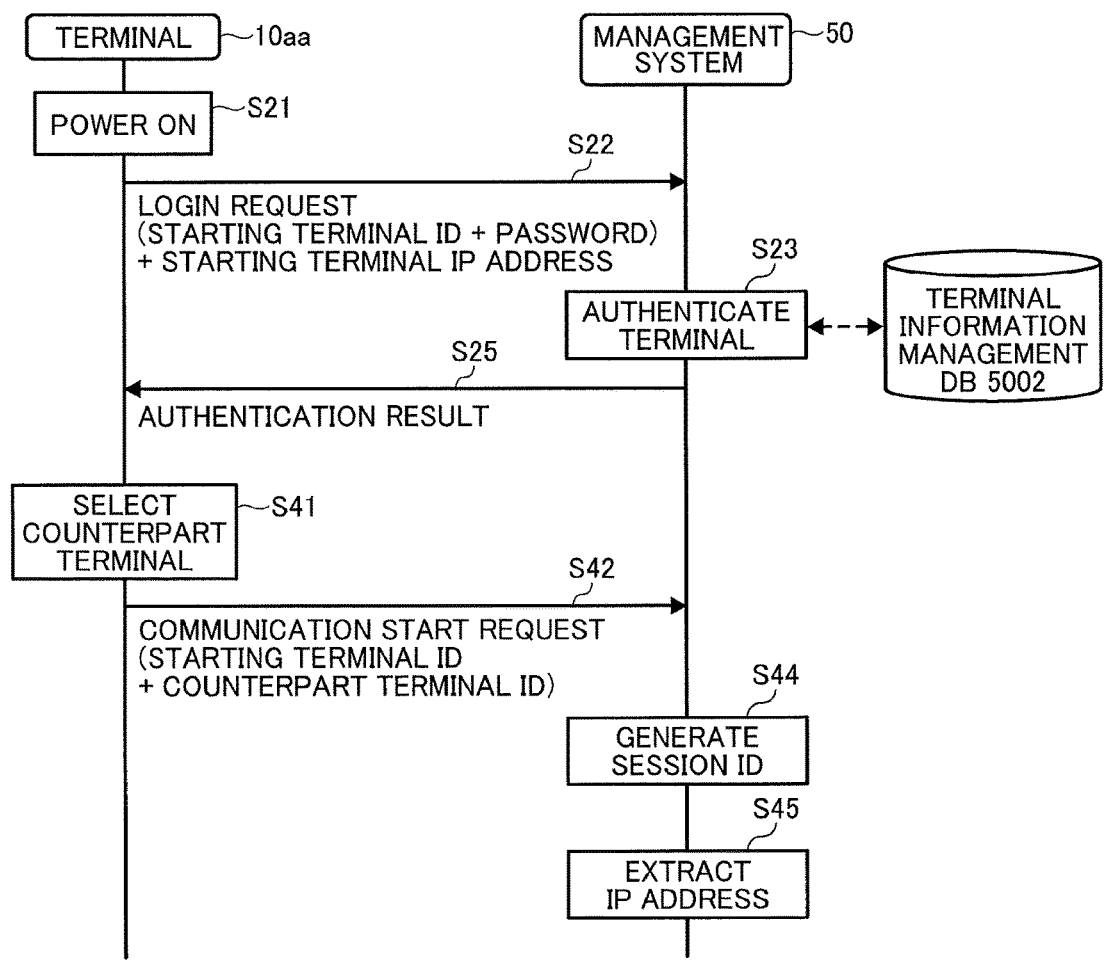
FIG. 10 is a data sequence diagram illustrating operation of preparing for starting communication between communication terminals, according to an embodiment of the present invention.

In the following, operation of communicating between the terminals 10 is described according to an embodiment of the present invention. The following illustrates the example case where the terminal 10aa, which is the dedicated terminal, communicates with the terminal 10da, which is the non-dedicated terminal. FIG. 10 is a data sequence diagram illustrating operation of preparing for starting communication between the dedicated terminal 10aa and the non-dedicated terminal 10da. In FIG. 10, various management data is transmitted or received through the management data session "sei" as described above referring to FIG. 2.

When the user of a starting terminal (terminal 10aa) turns on the power switch 109 illustrated in FIG. 3, the operation input 12 illustrated in FIG. 6 accepts the power on operation and turns on the power (S21). In response to acceptance of the power on operation, the login request 13 automatically transmits login request information indicating a login request from the transmitter/receiver 11 to the management system 50 via the communication network 2 (S22). The login request information includes a terminal ID for identifying the terminal 10aa, which is a local terminal serving as the starting terminal, and a password. The terminal ID and the password are data that have been read via the memory control 19 from the memory 1000 and sent to the transmitter/receiver 11. In the case of transmitting login request information from the terminal 10aa to the management system 50, the management system 50, which is a receiving side, can obtain the IP address of the terminal 10aa, which may be received from the terminal 10aa with the login request information.

Next, the terminal authenticator 52 of the management system 50 searches the terminal information management DB 5002 (FIG. 8) of the memory 5000 using the terminal ID and the password included in the login request information received via the transmitter/receiver 51 as search keys, and determines whether the same terminal ID and the same password are stored in the terminal information management DB 5002 (S23).

The transmitter/receiver 51 of the management system 50 transmits authentication result information indicating an authentication result obtained by the terminal authenticator 52 to the starting terminal (terminal 10*aa*) which has sent the above-mentioned login request, via the communication network 2 (S25). In the embodiment, the case in which it has been determined by the terminal authenticator 52 that the terminal 10*aa* is a terminal that has a legitimate use authority will be described as follows.

As the user at the dedicated terminal 10*aa* presses the operation keys 108 illustrated in FIG. 3 and selects the non-dedicated terminal 10*da* as a counterpart, the operation input 12 illustrated in FIG. 6 accepts a request for starting communication with the counterpart terminal 10*da* (S41). The transmitter/receiver 11 of the starting terminal 10*aa* transmits, to the management system 50, start request information indicating a request for starting communication (S42). The start request information includes the terminal ID "01aa" of the terminal 10*aa*, and the terminal ID ("01db") of the counterpart terminal (terminal 10*db*).

The session manager 56 of the management system 50 generates a session ID to be referred to when establishing a communication session between the starting terminal 10*aa* and the counterpart terminal 10*da* (S44). The generated session ID is stored in the memory 5000, for example, in association with the terminal IDs of the starting terminal 10*aa* and the counterpart terminal 10*da*.

The extractor 54 of the management system 50 searches the conversion management table (FIG. 9) using the terminal ID "01da" of the counterpart terminal (terminal 10*da*), received at the transmitter/receiver 51, as a search key, to obtain the IP address "1.3.2.2" of the conversion system 80 and the IP address "1.3.2.3" of the counterpart terminal 10*da* (S45).

Figure 11:
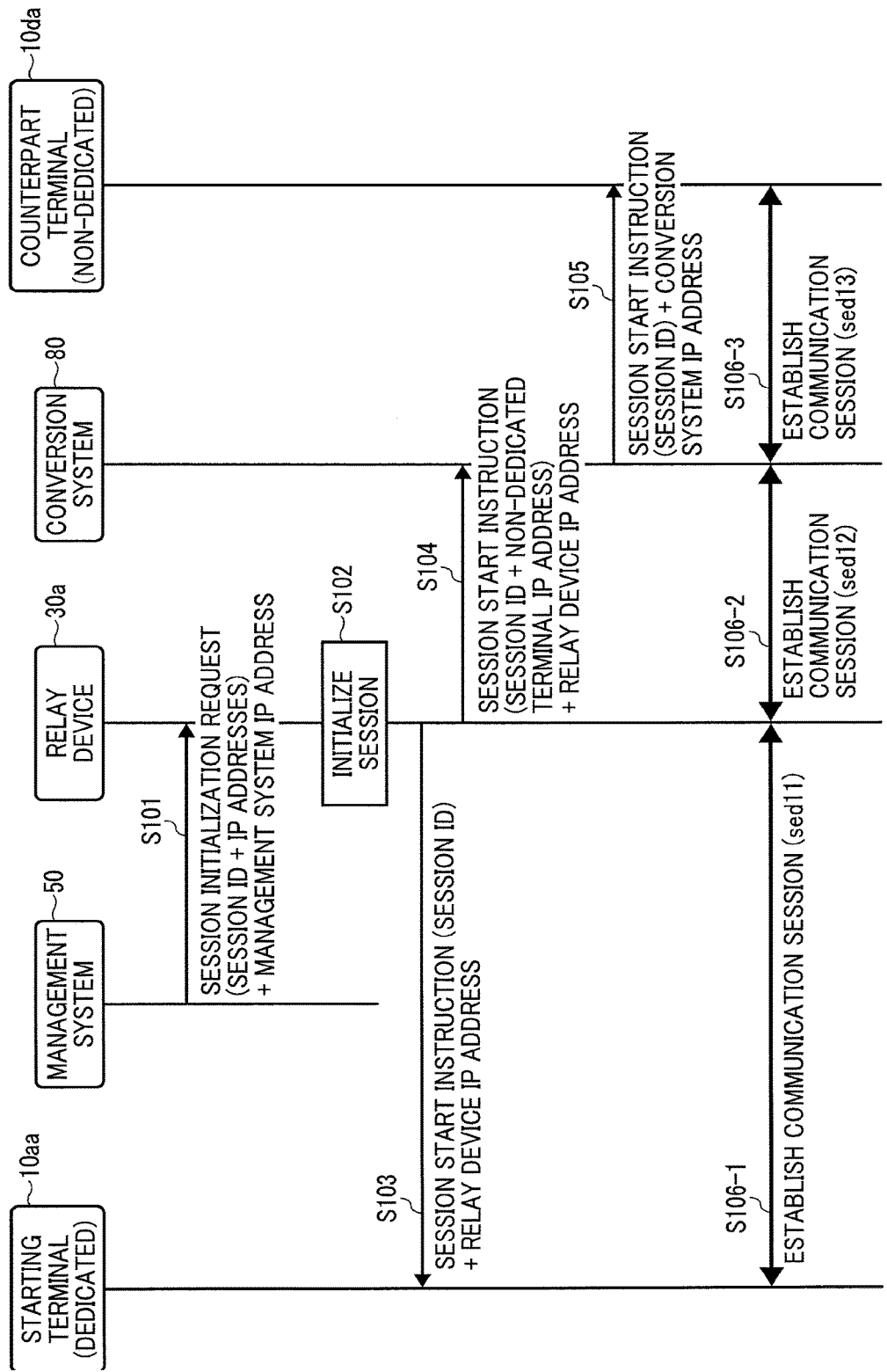
FIG. 11 is a data sequence diagram illustrating operation of establishing a communication session between a dedicated communication terminal and a non-dedicated communication terminal, according to an embodiment of the present invention.

Now, operation of establishing a communication session to start communication between the dedicated terminal 10*a* and the non-dedicated terminal 10*d* is described according to the embodiment. FIG. 11 is a data sequence diagram illustrating operation of establishing a communication session between the dedicated terminal 10*aa* and the non-dedicated terminal 10*da*. The transmitter/receiver 51 of the management system 50 transmits to the relay device 30*a*, session initialization request information (session initialization request) for requesting initialization of a communication session being managed by the relay device 30*a* (S101). The session initialization request includes a session ID, and the IP address of each one of the starting terminal 10*aa*, the conversion system 80, and the counterpart terminal 10*da*. The session ID has been generated at S44 of FIG. 10. The IP address of the starting terminal 10*aa* has been obtained by the management system 50, from the login request information received from the starting terminal 10*aa* at S22 of FIG. 10. The IP addresses of the conversion system 80 and the counterpart terminal 10*da* have been obtained at S45 of FIG. 10.

The management system 50 further transmits the IP address of the management system 50 to the relay device 30*a*, with the session initialization request. The transmitter/receiver 31 of the relay device 31 then receives the session initialization request and the IP address of the management system 50.

In response to the session initialization request, the transmitter/receiver 31 of the relay device 30*a* initializes the communication session (S102). The transmitter/receiver 31 transmits session start instruction information (session start instruction), which instructs to start a communication session, to the starting terminal 10*aa* (S103). The session start instruction includes the session ID transmitted from the management system 50 at S101. The relay device 30*a* further transmits the IP address of the relay device 30*a* to the starting terminal 10*aa*, with the session start instruction. The starting terminal 10*aa* then receives the session start instruction and the IP address of the relay device 30*a*, at the transmitter/receiver 11.

The transmitter/receiver 31 of the relay device 30*a* transmits a session start instruction for instructing to start the communication session, to the conversion system 80 (S104). The session start instruction includes the session ID transmitted from the management system 50 at S101, and the IP address of the counterpart terminal 10*da*. That is, the transmitter/receiver 31 transmits the IP address of the counterpart terminal 10*da*, that is the non-dedicated terminal, with the session start instruction. The relay device 30*a* further transmits the IP address of the relay device 30*a* to the conversion system 80, with the session start instruction. The conversion system 80 receives the session start instruction and the IP address of the relay device 30*a*, at the transmitter/receiver 81.

The transmitter/receiver 81 of the conversion system 80 transmits, to the counterpart terminal 10*da*, a session start instruction for instructing start of the communication session (S105). The session start instruction includes the session ID transmitted from the management system 50 at S101. The conversion system 80 further transmits the IP address of the conversion system 80, with the session start instruction, to the counterpart terminal 10*da*. The counterpart terminal 10*da* receives the session start instruction and the IP address of the conversion system 80, at the transmitter/receiver 11.

In response to the instruction received at the above-described S103, the starting terminal 10*aa* and the relay device 30*a* establish a first content communication session sed11 between the starting terminal 10*aa* and the relay device 30*a*, to transmit or receive content data (S106-1). In response to the instruction received at the above-described S104, the relay device 30*a* and the conversion system 80 establish a second content communication session sed12 between the relay device 30*a* and the conversion system 80, to transmit or receive content data (S106-2). In response to the instruction received at the above-described S105, the conversion system 80 and the counterpart terminal 10*da* establish a third content communication session sed13 between the conversion system 80 and the counterpart terminal 10*da*, to transmit or receive content data (S106-3).

Figure 12:
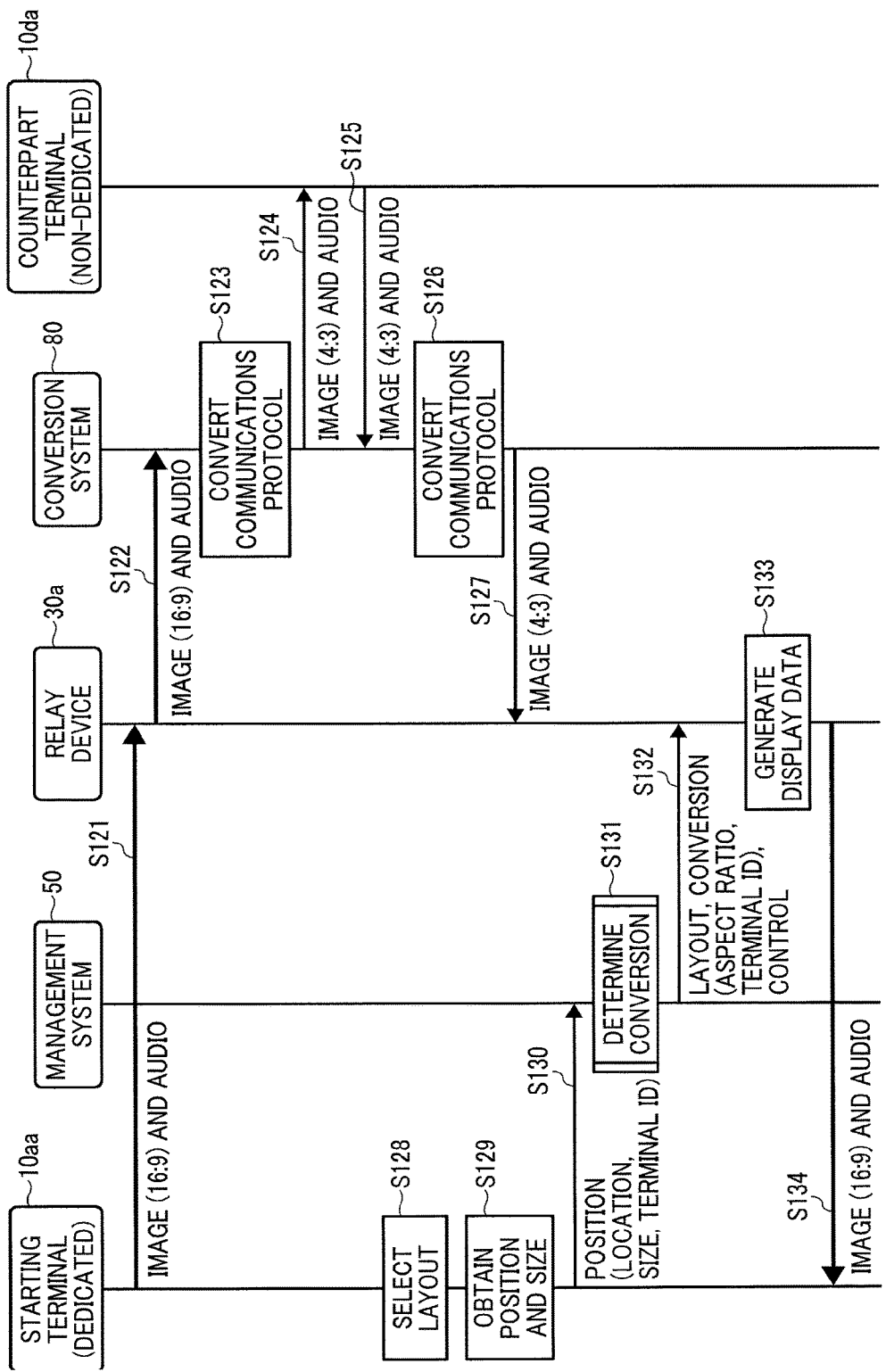
FIG. 12 is a data sequence diagram illustrating operation of transmitting or receiving content data between the dedicated communication terminal and the non-dedicated communication terminal, according to an embodiment of the present invention.

Referring to FIG. 12, operation of transmitting or receiving content data to carry out videoconference between the starting terminal 10*aa* and the counterpart terminal 10*da* is described according to the embodiment. FIG. 12 is a data sequence diagram illustrating operation of transmitting or receiving content data between the dedicated terminal 10*aa* and the non-dedicated terminal 10*da*.

The starting terminal 10*aa* captures an object (such as the user) with the image capturer 14 to generate image data, and processes audio input by the audio input 15*a* to generate audio data. The stating terminal 10*aa* transmits the image data and the audio data to the relay device 30*a* via the communication network 2, through the first content communication session sed11 (S121). In this example, the image data for transmission has an aspect ratio of 16:9, such that it has the resolution of 1920 pixels by 1080 pixels. Further, the communications protocol being used by the dedicated terminal 10*aa* is H.264/SVC standard. The relay device 30*a* thus receives the image data with the 16:9 aspect ratio, and the audio data, at the transmitter/receiver 31, in the H.264/SVC standard.

The transmitter/receiver 31 of the relay device 30*a* transmits, to the conversion system 80 via the communication network 2, the image data with the 16:9 aspect ratio and the audio data (S122). The conversion system 80 receives the image data with the 16:9 aspect ratio, and the audio data, at the transmitter/receiver 81. This transmission is processed through the second content communication session sed12, in the H.264/SVC standard.

The communications protocol converter 82 of the conversion system 80 converts the image data with the 16:9 aspect ratio, from a communications protocol compatible with the starting terminal 10aa to a communications protocol compatible with the counterpart terminal 10da, using the conversion rule data stored in the memory 8000 (S123). In addition to conversion of the communications protocol, in one example, the communications protocol converter 82 converts the 16:9 image data, to image data with the 4:3 aspect ratio such as the image data having a resolution of 1440 pixels by 1080 pixels, according to the conversion rule data.

The transmitter/receiver 81 of the conversion system 80 transmits, to the counterpart terminal 10da via the communication network 2, the converted image data and the audio data through the third content communication session sed 13, in the H.261 standard (S124). The counterpart terminal 10da receives the image data with the 4:3 aspect ratio, and the audio data, at the transmitter/receiver 11.

In case the counterpart terminal 10da transmits image data and audio data to the starting terminal 10aa, the counterpart terminal 10da transmits image data with the 4:3 aspect ratio and audio data to the conversion system 80 through the third content communication session sed13 (S125). For example, such 4:3 image data has a resolution of 1440 pixels by 1080 pixels. The conversion system 80 receives the image data with the 4:3 aspect ratio, and the audio data, at the transmitter/receiver 81.

The communications protocol converter 82 of the conversion system 80 converts the image data with the 4:3 aspect ratio, from a communications protocol compatible with the counterpart terminal 10da (H.261) to a communications protocol compatible with the starting terminal 10aa (H.264/SVC), using the conversion rule data stored in the memory 8000 (S126).

The transmitter/receiver 81 of the conversion system 80 transmits, to the relay device 30a via the communication network 2, the 4:3 image data and the audio data, in the converted communications protocol, through the second content communication session sed 12 (S127). The relay device 30a receives the image data with the 4:3 aspect ratio, and the audio data, at the transmitter/receiver 31.

At S126, in addition to conversion of the communications protocol, the communications protocol converter 82 could convert the 4:3 image data, to image data with the 16:9 aspect ratio according to the conversion rule data, for transmission to the starting terminal 10aa for display. However, in this embodiment illustrated in FIG. 12, the communications protocol converter 82 transmits the 4:3 image data to the relay device 30a, as the 4:3 image data may not have to be converted.

That is, even when the image data can be converted for display at the dedicated terminal 10aa or the non-dedicated terminal 10da, the image data being converted may be distorted, for example, if the aspect ratio of the image itself is changed, or if the image is to be displayed according to a layout as specified by the user. In the following, it is assumed that the user at the dedicated terminal 10aa inputs a user instruction for displaying images according to a specific layout.

At the terminal 10aa, the operation input 12 receives, from the user, the user instruction for selecting a desired layout among a plurality of layouts being managed by the layout management table (S128). For example, a list of layouts available for selection may be displayed on the display 120aa for the terminal 10aa. In the following, it is assumed that the layout with the layout ID "L01" is selected.

The layout data obtainer 17 searches the layout data management table (FIG. 7A) using the layout ID "L01" that is selected by the user as a search key, to obtain the position information (0, 16.6) (50, 16.6) and the size information (50, 66.6) of the frames of the selected layout (S129).

The transmitter/receiver 11 of the terminal 10aa transmits the layout information, which includes the position information and the size information, and the terminal ID "01aa" of the terminal 10aa that selects the layout, to the management system 50 (S130).

Figure 13:
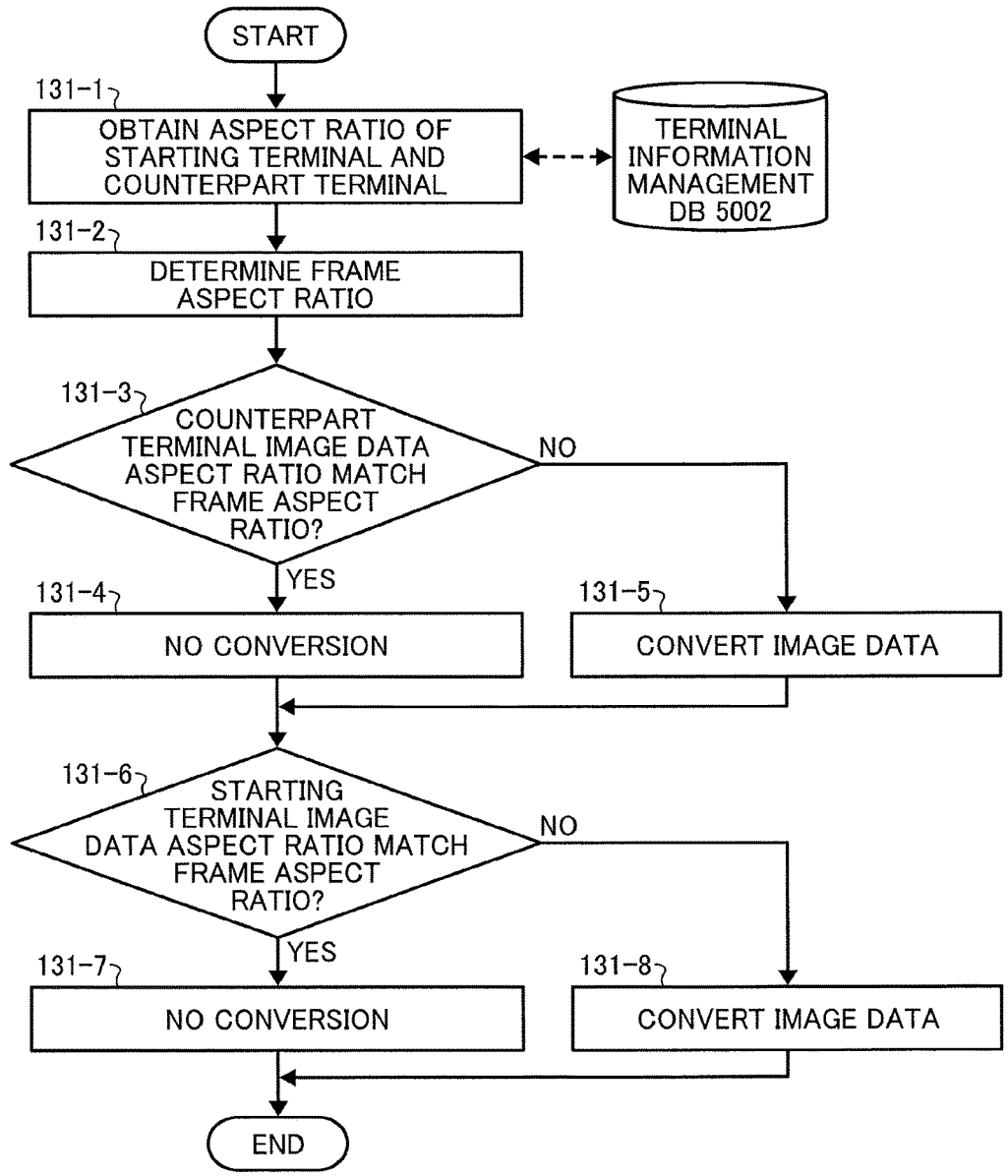
FIG. 13 is a flowchart illustrating operation of determining whether to convert image data for transmission, according to an embodiment of the present invention.

The transmitter/receiver 51 of the management system 50 receives the layout information and the terminal ID "01aa" of the terminal 10aa that selects the layout. The management system 50 determines whether the image data is to be converted, between the starting terminal 10aa and the counterpart terminal 10da (S131). Referring to FIG. 13, operation of determining whether to convert image data is described according to the embodiment. FIG. 13 is a flowchart illustrating operation of determining whether to convert image data.

The aspect ratio obtainer 57 searches the terminal information management table (FIG. 8) using the terminal ID "01da" of the starting terminal 10aa, and the terminal ID "01da" of the counterpart terminal 10da, as search keys to obtain the aspect ratio "16:9" for the starting terminal 10aa and the aspect ratio "4:3" for the counterpart terminal 10da (S131-1). More specifically, the aspect ratio obtainer 57 uses the terminal ID "01aa" of the starting terminal 10aa that is received at S130, as a search key, to obtain the aspect ratio "16:9" for the terminal 10aa. The aspect ratio obtainer 57 further identifies the counterpart terminal 10da, by referring to the memory 5000 that stores association of the terminal ID "01aa" and the terminal ID "01da" with the same session ID, and obtains the aspect ratio "4:3" for the counterpart terminal 10da.

The aspect ratio obtainer 57 further determines the aspect ratio of each frame in the layout selected at the starting terminal 10aa (S131-2). In this example, the aspect ratio obtainer 57 multiplies the aspect ratio "16:9" of the image data compatible with the starting terminal 10aa, with the size (50, 66.6) of the frame that is obtainable from the layout information transmitted from the starting terminal 10aa at S130. Based on the calculated value "16*50%=8, 9*66.6%=6", the aspect ratio obtainer 57 determines that the aspect ratio of the frame is "4:3".

The determiner 55 determines whether the aspect ratio of the image data to be transmitted from the counterpart terminal 10da, matches the aspect ratio of the frame of the selected layout for display at the starting terminal 10aa (S131-3). The aspect ratio of the image data to be transmitted from the counterpart terminal 10da is an aspect ratio of the image data that can be processed by the counterpart terminal 10da as obtained at S131-1. When the aspect ratio "4:3" of the image data that can be processed by the counterpart terminal 10da, obtained at S131-1, matches the aspect ratio of the frame of the selected layout, obtained at S131-2, the determiner 55 determines that the aspect ratios match between the image data to be transmitted and the frame of the selected layout ("YES") at S131-3.

When S131-3 is YES, the determiner 55 determines not to convert the image data to be transmitted from the counterpart terminal 10da (S131-4). When S131-3 is NO, the determiner 55 determines to convert the image data to be transmitted from the counterpart terminal 10*da*, such that the converted image data has the aspect ratio of the frame as obtained at S131-2 (S131-5).

The determiner 55 determines whether the aspect ratio of the image data to be transmitted from the starting terminal 10*aa* matches the aspect ratio of the frame of the selected layout (S131-6). The aspect ratio of the image data to be transmitted from the starting terminal 10*da* is an aspect ratio of the image data that can be processed by the starting terminal 10*aa* as obtained at S131-1. When the aspect ratio "16:9" of the image data that can be processed by the starting terminal 10*aa*, obtained at S131-1, does not match the aspect ratio of the frame of the selected layout, obtained at S131-2, the determiner 55 determines that the aspect ratios do not match between the image data to be transmitted and the frame of the selected layout ("NO") at S131-6.

When S131-6 is YES, the determiner 55 determines not to convert the image data to be transmitted from the starting terminal 10*aa* (S131-7). When S131-6 is NO, the determiner 55 determines to convert the image data to be transmitted from the starting terminal 10*aa*, such that the converted image data has the aspect ratio of the frame as obtained at S131-2 (S131-5).

Referring back to FIG. 12, the transmitter/receiver 51 of the management system 50 transmits, to the relay device 30*a*, the layout information and the terminal ID of the starting terminal 10*aa* that are received from the starting terminal 10*aa* at S130 (S132). When it is determined that the image data is to be converted at S131-5 or S131-8, the transmitter/receiver 51 transmits to the relay device 30*a*, conversion information including the terminal ID of the terminal as a transmission source of the target image data and the aspect ratio of the frame. The following describes an example case in which, the operation proceeds to S131-4 to determine not to convert the image data to be transmitted from the counterpart terminal 10*da*, and the operation proceeds to S131-8 to determine to convert the image data to be transmitted from the starting terminal 10*aa*. In such case, at S132, the transmitter/receiver 51 of the management system 50 transmits, to the relay device 30*a*, the conversion information including the terminal ID "01aa" of the starting terminal 10*aa* sending the target image data for conversion, as information indicating a transmission source of data for conversion, in addition to the aspect ratio of each frame. At S132, the transmitter/receiver 51 of the management system 50 further transmits, to the relay device 30*a*, control information to be used for generating image data to be transmitted to the starting terminal 10*aa* from the counterpart terminal 10*da*. More specifically, the control information instructs to generate an image with the 16:9 aspect ratio, which includes a frame having the image transmitted from the starting terminal 10*aa* being displayed therein after conversion, and a frame having the image transmitted from the counterpart terminal 10*da* being displayed therein.

The transmitter/receiver 31 of the relay device 30*a* receives the layout information, conversion information, and control information. The image generator 32 of the relay device 30*a* generates image data ("display data") to be displayed at the starting terminal 10*aa*, based on the image data received from the starting terminal 10*aa* and the counterpart terminal 10*da*, according to the layout information, the conversion information, and the control information (S133).

Figure 14A:
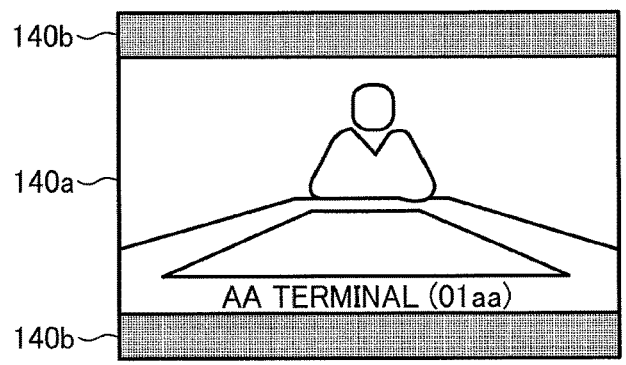
FIGS. 14A, 14B, and 14C are illustration of example screens to be displayed at the communication terminal.

According to the conversion information, the image generator 32 generates a converted image, based on the image transmitted from the starting terminal 10*aa*. In this embodiment, however, conversion corresponds to operation of changing an aspect ratio of the image to be transmitted to one terminal (non-dedicated terminal or dedicated terminal), without changing an aspect ratio of the original image transmitted from the other terminal (dedicated terminal or non-dedicated terminal). FIG. 14A illustrates an example of a converted image that is generated from an image 140*a* transmitted from the starting terminal 10*aa*. The relay device 30*a* receives the image 140*a* with the aspect ratio of 16:9 from the dedicated terminal 10*aa* at the transmitter/receiver 31. The image generator 33 adds an image 140*b* to each of an upper portion above the image 140*a* and a lower portion below the image 140*a*, to generate an image with the aspect ratio of 4:3, without converting the image 140*a* itself. The image 140*a* to be added may be in black or any dark color. Since the image 140*a* is not converted, but re-created as the image having the 4:3 aspect ratio, the image will not be distorted even when it is displayed at the display 120 for the non-dedicated terminal 10*da*.

Figure 14B:
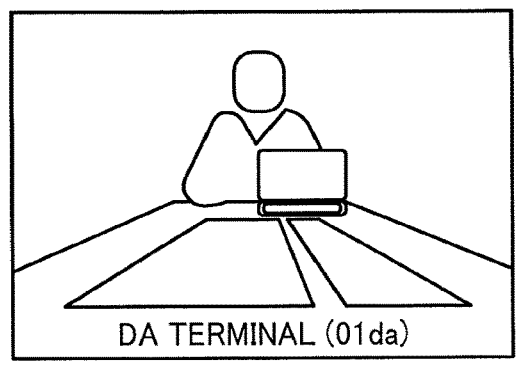

On the other hand, the image generator 133 does not convert the image with the aspect ratio of 4:3, which is transmitted from the non-dedicated terminal 10*da*, before transmitting to the dedicated terminal 10*aa*. FIG. 14B illustrates an example of the image transmitted from the non-dedicated terminal 10*da*.

Figure 14C:
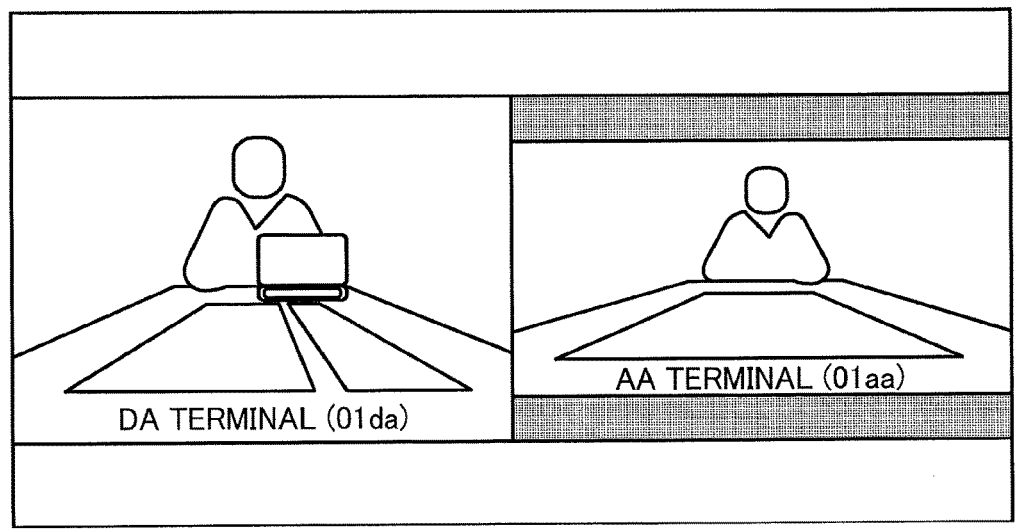

The image generator 133 refers to the control information and the layout information that are transmitted from the management system 50, to generate a combined image for output through the display 120 for the dedicated terminal 10*aa*. The image generator 133 generates a background image with the aspect ratio of 16:9, which can be processed by the starting terminal 10*aa*. In this example, the background image includes two frames as indicated by the control information and the layout information. Each frame is placed at a position indicated by the position information of the layout information, and has a size indicated by the size information of the layout information. According to the control information, to one frame of the background image, the image generator 133 adds the image with the aspect ratio of 4:3 that is transmitted from the counterpart terminal 10*da*, which is illustrated in FIG. 14B. According to the control information, to the other frame of the background image, the image generator 133 adds the converted image with the aspect ratio of 4:3 that is originally transmitted from the starting terminal 10*aa*, which is illustrated in FIG. 14A. Accordingly, a combined image having the images of both of the terminals 10*aa* and 10*da* is generated, for example, as illustrated in FIG. 14.

Referring to FIG. 12, the relay device 30*a* transmits the combined image data generated at S133, and the audio data, to the starting terminal 10*aa* via the communication network 2 through the first content communication session sed11 (S134).

The starting terminal 10*aa* receives the combined image data and the audio data at the transmitter/receiver 11.

The display control 16 of the terminal 10*aa* controls the display 120*aa* to display a combined image, based on the received combined image data. As described above referring to FIGS. 14A to 14C, the image captured at the dedicated terminal 10*aa* and the image captured at the non-dedicated terminal 10*da*, each having the aspect ratio compatible with the display 120, are combined into one image, the display 120*aa* is able to display the combined image without distortion.

As described above, in the above-described embodiment, the management system 50 stores, in the terminal information management DB 5002, a first aspect ratio (16:9) of a first image to be transmitted between the dedicated terminal 10aa and the relay device 30, and a second aspect ratio (4:3) of a second image to be transmitted between the non-dedicated terminal 10da and the relay device 30. The management system 50 receives, from the dedicated terminal 10aa, size information indicating a size of a display area (a frame) to be displayed by the display 120aa for the dedicated terminal 10aa. The management system 50 determines an aspect ratio (4:3) of the display area based on the first aspect ratio (16:9) and the size of the display area. The management system 50 generates control information that instructs to add the second image, with the second aspect ratio (4:3), transmitted from the non-dedicated terminal 10da, to the display area in a background image having the first aspect ratio (16:9). The management system 50 further transmits the control information to the relay device 30.

Accordingly, the relay device 30 adds the image transmitted from the non-dedicated terminal 10da, without changing its aspect ratio, to the display area. This prevents the image from distortion, which may otherwise be caused due to conversion.

For example, if it is known that the non-dedicated terminal 10da can only process an image with a certain aspect ratio, the layout to be used by the dedicated terminal 10aa may be previously set to include a frame size that matches the aspect ratio of the second image to be transmitted from the non-dedicated terminal 10da. This eliminates image size conversion, thus preventing image distortion.

Furthermore, the layout may include a display area for displaying the first image to be transmitted from the dedicated terminal 10aa. In such case, the layout to be used by the dedicated terminal 10aa may be previously set to include a frame size that matches the aspect ratio of the first image to be transmitted from the dedicated terminal 10aa. This eliminates image size conversion, thus preventing image distortion.

The relay devices 30, the management system 50, the conversion system 80, the program providing system 90, and the maintenance system 100, in any one of the above-described embodiments may be implemented by a single computer or a plurality of computers to which divided portions (functions) are arbitrarily allocated. In the case where the program providing system 90 is configured by a single computer, a program transmitted by the program providing system 90 may be separately transmitted in units of a plurality of modules, or may be transmitted in its entirety. Further, in the case where the program providing system 90 is configured by a plurality of computers, a program may be divided into a plurality of modules, and the modules may be individually transmitted from the respective computers.

In addition, a memory storing any one of the above-described control programs, such as a recording medium including a CD-ROM or a HDD, may be provided in the form of a program product to users within a certain country or outside that country.

Although the IP address of each terminal 10 is managed in the above-described embodiment, the embodiment is not limited to this case, such that a fully qualified domain name (FQDN) of each terminal 10 may be managed instead, or any other identification information for identifying the terminal 10 on the communication network 2. In this case, an IP address corresponding to an FQDN is obtained by a Domain Name System (DNS) server of the related art.

In addition, although the case of a videoconference system has been described as an example of the communication system 1 in the above-described embodiment, the embodiment is not limited to this case, such that the communication system 1 may be a phone system such as an IP phone system or an Internet phone system. In another embodiment, the communication system 1 may be a car navigation system. In such case, the terminal 10 at one end may correspond to a car navigation system mounted on one automobile, and the terminal 10 at the other end may correspond to a management terminal or a management server at the management center for managing the car navigation system, or a car navigation system mounted on the other automobile. The communication system 1 may be a telephone system including a mobile phone. In such case, the terminal 10 may correspond to a phone, such as the mobile phone.

In addition, although the case in which a videoconference is held by the communication system 1 has been described in the above-described embodiment, the embodiment is not limited to this case. The communication system 1 may be used in meetings, general conversation between family members or friends, or one-way presentation of information.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

For example, the examples of layout are not limited to the above-described examples of layout illustrated in FIGS. 7A to 7C. In particular, the layout may be provided, which only includes one frame for displaying the image captured at the counterpart terminal 10. When the layout having only one frame is selected at the starting terminal 10aa, the management system 50 generates control information that instructs to place the image of FIG. 14B that is generated based on the image captured at the counterpart terminal 10da, to a frame of the image having the aspect ratio that can be processed by the starting terminal 10aa.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A communication management system connected to a relay device through a network, the communication management system comprising:
 a memory to store a first aspect ratio of a first image to be transmitted between a first communication terminal and the relay device, and a second aspect ratio of a second image to be transmitted between a second communication terminal and the relay device;
 a first receiver to receive, from the first communication terminal, size information indicating a size of one or more display areas to be displayed on a screen of a first display provided for the first communication terminal, the one or more display areas including a first display area for displaying the first image;
 first circuitry to
  determine an aspect ratio of the first display area based on the first aspect ratio of the first image and a size of the first display area, and generate control information for generating a combined image having the first aspect ratio, the control information instructing to add the second image having the second aspect ratio to the first display area having the determined aspect ratio and to add a rectangular-shaped image to each of an upper portion and a lower portion of the first image based on the first aspect ratio when generating the combined image; and first transmitter circuitry to transmit the generated control information to the relay device to cause the relay device to generate the combined image including the first display area, the combined image being transmitted to the first communication terminal for display at the first communication terminal, wherein, when the one or more display areas further include a second display area for displaying the first image, the first circuitry is further configured to determine an aspect ratio of the second display area based on the first aspect ratio of the first image and the size of the second display area, and generate the control information that additionally instructs to add the first image having the first aspect ratio to the second display area having the determined aspect ratio, such that the combined image further includes the second display area.

2. The communication management system of claim 1, wherein the first circuitry is further configured to determine whether the determined aspect ratio of the first display area matches the second aspect ratio of the second image, and add the second image having the second aspect ratio, without size conversion, to the first display area, when determining that the determined aspect ratio matches the second aspect ratio.

3. The communication management system of claim 1, wherein the size information is previously set such that the determined aspect ratio of the first display area matches the second aspect ratio of the second image to be added to the first display area.

4. The communication management system of claim 1, wherein the size information is previously set such that the determined aspect ratio of the second display area matches the first aspect ratio of the first image to be added to the second display area.

5. The communication management system of claim 1, wherein the first receiver is further configured to receive, from the first communication terminal, position information indicating a position at which each one of the one or more display areas is displayed on the screen, and the control information further instructs to include the first display area in the combined image at a position indicated by the position information.

6. The communication management system of claim 5, wherein the size information and the position information is received from the first communication terminal as layout information indicating a layout selected by a user at the first communication terminal.

7. A communication system, comprising:
the communication management system of claim 1; and
the relay device including:
a second receiver to receive the second image having the second aspect ratio from the second communication terminal;
second circuitry to add the second image to the first display area having the determined aspect ratio to generate the combined image having the first aspect ratio, according to the control information; and
second transmitter circuitry to transmit the combined image having the first aspect ratio to the first communication terminal.

8. The communication system of claim 7, further comprising:
the first communication terminal to display the combined image, with the first aspect ratio, including the second image in the first display area.

9. A method of controlling display of an image, comprising:
storing, in a memory, a first aspect ratio of a first image to be transmitted between a first communication terminal and a relay device, and a second aspect ratio of a second image to be transmitted between a second communication terminal and the relay device;

receiving, from the first communication terminal, size information indicating a size of one or more display areas to be displayed on a screen of a first display provided for the first communication terminal, the one or more display areas including a first display area for displaying the first image;

determining an aspect ratio of the first display area based on the first aspect ratio of the first image and a size of the first display area;

generating control information for generating a combined image having the first aspect ratio, the control information instructing to add the second image having the second aspect ratio to the first display area having the determined aspect ratio and add a rectangular-shaped image to each of an upper portion and a lower portion of the first image based on the first aspect ratio when generating the combined image; and transmitting the control information to the relay device to cause the relay device to generate the combined image including the first display area, the combined image being transmitted to the first communication terminal for display at the first communication terminal, wherein, when the one or more display areas further include a second display area for displaying the first image, the method further comprises determining an aspect ratio of the second display area based on the first aspect ratio of the first image and the size of the second display area, and generating the control information that additionally instructs to add the first image having the first aspect ratio, to the second display area having the determined aspect ratio, such that the combined image further includes the second display area.

10. The method of claim 9, further comprising:
determining whether the determined aspect ratio of the first display area matches the second aspect ratio of the second image; and adding the second image having the second aspect ratio, without size conversion, to the first display area, when determining that the determined aspect ratio matches the second aspect ratio.

11. The method of claim 9, further comprising:
setting the size information such that the determined aspect ratio of the first display area matches the second aspect ratio of the second image to be added to the first display area.

12. The method of claim 9, further comprising:
setting the size information such that the determined aspect ratio of the second display area matches the first aspect ratio of the first image to be added to the second display area.

13. The method of claim 9, further comprising:
receiving, from the first communication terminal, position information indicating a position at which each one of the one or more display areas is displayed on the screen,
wherein the control information further instructs to include the first display area in the combined image at a position indicated by the position information.

14. A non-transitory recording medium which, when executed by one or more processors, cause the processors to perform a method of controlling display of an image, the method comprising:
storing, in a memory, a first aspect ratio of a first image to be transmitted between a first communication terminal and a relay device, and a second aspect ratio of a second image to be transmitted between a second communication terminal and the relay device;
receiving, from the first communication terminal, size information indicating a size of one or more display areas to be displayed on a screen of a first display provided for the first communication terminal, the one or more display areas including a first display area for displaying the first image;
determining an aspect ratio of the first display area based on the first aspect ratio of the first image and the size of the first display area;
generating control information for generating a combined image having the first aspect ratio, the control information instructing to add the second image having the second aspect ratio to the first display area having the determined aspect ratio and add a rectangular-shaped image to each of an upper portion and a lower portion of the first image based on the first aspect ratio when generating the combined image; and
transmitting the control information to the relay device to cause the relay device to generate the combined image including the first display area, the combined image being transmitted to the first communication terminal for display at the first communication terminal,
wherein, when the one or more display areas further include a second display area for displaying the first image, the method further comprises determining an aspect ratio of the second display area based on the first aspect ratio of the first image and the size of the second display area, and generating the control information that additionally instructs to add the first image having the first aspect ratio, to the second display area having the determined aspect ratio, such that the combined image further includes the second display area.

\* \* \* \* \*